(12) United States Patent
Sinha

(10) Patent No.: US 7,042,802 B2
(45) Date of Patent: May 9, 2006

(54) DETERMINATION OF STRESS CHARACTERISTICS OF EARTH FORMATIONS

(75) Inventor: Bikash K. Sinha, Redding, CT (US)

(73) Assignee: Schlumberger Technology Corporation, Ridgefield, CT (US)

(*) Notice: Subject to any disclaimer, the term of this patent is extended or adjusted under 35 U.S.C. 154(b) by 207 days.

(21) Appl. No.: 10/665,134

(22) Filed: Sep. 18, 2003

(65) Prior Publication Data

US 2005/0065730 A1  Mar. 24, 2005

(51) Int. Cl.
*G01V 1/00* (2006.01)

(52) U.S. Cl. .......................... 367/86; 367/25; 367/31; 367/32; 73/152.51; 73/152.52; 702/11

(58) Field of Classification Search .............. 367/86, 367/31, 32, 25, 73, 75; 73/152.51–152.52; 702/6, 11, 18
See application file for complete search history.

(56) References Cited

U.S. PATENT DOCUMENTS

| 5,136,554 | A  | * | 8/1992  | Thomsen et al. | 367/75 |
|---|---|---|---|---|---|
| 5,142,471 | A  | * | 8/1992  | Desbrandes | 702/12 |
| 5,236,040 | A  | * | 8/1993  | Venditto et al. | 166/250.1 |
| 5,353,637 | A  | * | 10/1994 | Plumb et al. | 73/152.17 |
| 5,398,215 | A  | * | 3/1995  | Sinha et al. | 367/31 |
| 5,838,633 | A  |   | 11/1998 | Sinha | 367/31 |
| 6,351,991 | B1 |   | 3/2002  | Sinha | 73/152.01 |
| 6,714,480 | B1 | * | 3/2004  | Sinha et al. | 367/31 |
| 6,714,873 | B1 | * | 3/2004  | Bakulin et al. | 702/14 |
| 2003/0167835 | A1 | * | 9/2003  | Sinha et al. | 73/152.16 |

OTHER PUBLICATIONS

Walls, et al. "Topical Report: In situ azimuth and magnitude from well log measurements." (abstract only) GAS RES Inst. Rep No GRI-94/0271, 1994.*

Sinha and Winkler. "Formation nonlinear constants from sonic measurements at two boreholes." Geophysics, vol. 63, No. 3 (Nov.-Dec. 1999).*

Lang, et al. "Estimating slowness dispersion from arrays of sonic logging waveforms." Geophysics, vol. 52, No. 4 (Apr. 1987).*

(Continued)

*Primary Examiner*—Jack Keith
*Assistant Examiner*—Scott A. Hughes
(74) *Attorney, Agent, or Firm*—Jody Lynn DeStefanis; Martin M. Novack; Dale Gaudier

(57) ABSTRACT

A method for determining the maximum and minimum horizontal stresses of formations surrounding a borehole includes the following steps: suspending a logging device in the borehole; transmitting sonic energy from the logging device to establish flexural waves in the formations; receiving, at the logging device, sonic energy from the flexural waves, and producing, from the received sonic energy, measurement signals at a number of frequencies; determining, at the number of frequencies, the fast and slow flexural wave velocities in the formations, to obtain fast and slow flexural velocity dispersions; establishing a model of formation stresses in which stresses of a loaded state are represented by the sum of an omnidirectional hydrostatically loaded mean reference stress, a vertical stress perturbation, and maximum and minimum horizontal stress perturbations; establishing an inversion model that includes inputs from the fast and slow flexural velocity dispersions and also includes unknown horizontal perturbations of the model of formation stresses; deriving, from the inversion model, estimates of the maximum and minimum horizontal stress perturbations; and determining, from the estimates of the maximum and minimum horizontal stress perturbations and the mean reference stress, estimates of the maximum and minimum horizontal stresses of the formations.

43 Claims, 18 Drawing Sheets

OTHER PUBLICATIONS

Esmersoy, C. et al. *Dipole Shear Anisotropy Logging.* 64th Ann. Internat. Mtg., Soc. Espl. Geophys., Expanded Abstracts, pp. 1139-1142 (1994).

Harrison, A. R. et al. *Acquisition and Analysis of Sonic Waveforms from a Borehole Monopole and Dipole Source for the Determination of Compressional and Shear Speeds and their Relation to Rock Mechanical Properties and Surface Seismic Data.* Paper SPE 20557, SPE Annual Tech. Conf and Exhibition (Sep. 23-26, 1990).

Hottman, C. E. et al. *Estimation of Formation Pressures from Log-Derived Shale Properties.* J. Pet. Tech, vol. 17, No. 6, pp. 717-722 (1965).

Kimball, C. V. et al. *Semblance Processing of Borehole Acoustic Array Data.* Geophysics, vol. 49, Sec. 3, pp. 274-281 (1984).

Matthews, W. R. et al. *How to Predict Formation Pressure and Fracture Gradient from Electric and Sonic Logs.* The Oil and Gas Journal, pp. 92-106 (1967).

Moore, P. L. *Drilling Practices Manual.* The Petroleum Publishing Co., pp. 269-326 (1974).

Mueller, M. et al. *Case Studies of the Dipole Shear Anisotropy Log.* 64th Ann. Internat. Mtg., Soc. Expl. Geophys., Expanded Abstracts, pp. 1143-1146 (1994).

Norris, A. N. et al. *Acoustoelasticity of Solid/Fluid Composite Systems.* Geophys. J. Int., vol. 118, pp. 439-446 (1994).

Nur, et al. *An Exact Effective Stress Law for Elastic Deformation of Rock with Fluids.* J. of Geophys. Res., vol. 76, pp. 6414-6419 (1971).

Sinha, B. K. et al. *Case History Dipole Dispersion Crossover and Sonic Logs in a Limestone Reservoir.* Geophysics vol. 65, No. 2 (Mar.-Apr. 2000) pp. 390-407.

Sinha, B. K. *Elastic Waves in Crystals Under a Bias.* Ferroelectrics, vol. 41, pp. 61-73 (1982).

Sinha, B. K. et al. *Stress-induced Azimuthal Anisotropy in Borehole Flexural Waves.* Geophysics, vol. 61, Sec. 6, pp. 1899-1907, (1996).

Sinha, B. K. *Sensitivity and Iversion of Borehole Fexural Dispersions for Formation Parameters.* Geophysical Journal International, vol. 128(1), pp. 84-96 (Jan. 1997).

Thurston, R. N. et al. *Third-Order Elastic Constants and the Velocity of Small Amplitude Elastic Waves in Homogeneous Stressed Media.* Phys. Rev., vol. 133, A1604-A1610 (1964).

Walsh. *The Effects of Cracks on The Compressibility of Rocks.* J. of Geophys. Res., vol. 70, pp. 381 (1965).

\* cited by examiner

DETERMINATION OF STRESS CHARACTERISTICS OF EARTH FORMATIONS

FIELD OF THE INVENTION

This invention relates to investigation of earth formations and, more particularly, to a method and apparatus for obtaining properties of earth formations using sonic logging and determining stress characteristics of the earth formations.

BACKGROUND OF THE INVENTION

It is well known that mechanical disturbances can be used to establish acoustic waves in earth formations surrounding a borehole, and the properties of these waves can be measured to obtain important information about the formations through which the waves have propagated. Parameters of compressional, shear, and Stoneley waves, such as their velocity (or its reciprocal, slowness) in the formation and in the borehole, can be indicators of formation characteristics that help in evaluation of the location and/or producibility of hydrocarbon resources.

An example of a logging device that has been used to obtain and analyze sonic logging measurements of formations surrounding an earth borehole is called a Dipole Shear Sonic Imager ("DSI"—trademark of Schlumberger), and is of the general type described in Harrison et al., "Acquisition and Analysis of Sonic Waveforms From a Borehole Monopole And Dipole Source For The Determination Of Compressional And Shear Speeds And Their Relation To Rock Mechanical Properties And Surface Seismic Data", Society of Petroleum Engineers, SPE 20557, 1990.

An acoustic source in a fluid-filled borehole generates headwaves as well as relatively stronger borehole-guided modes. A standard sonic measurement system consists of placing a piezoelectric or electrodynamic source and an array of hydrophone receivers inside a fluid-filled borehole. The acoustic source is configured in the form of either a monopole or a dipole source. The source bandwidth typically ranges from 0.5 to 20 kHz. A monopole source generates primarily the lowest-order axisymmetric mode, also referred to as the Stoneley mode, together with compressional and shear headwaves. In contrast, a dipole source primarily excites the lowest-order borehole flexural mode together with compressional and shear headwaves. The headwaves are caused by the coupling of the transmitter acoustic energy to plane waves in the formation that propagate along the borehole axis. An incident compressional wave in the borehole fluid produces critically refracted compressional waves in the formation. These refracted waves along the borehole surface are known as compressional headwaves. The critical incidence angle $\theta_i = \sin^{-1}(V_f/V_c)$, where $V_f$ is the compressional wave speed in the borehole fluid; and $V_c$ is the compressional wave speed in the formation. As the compressional headwave travels along the interface, it radiates energy back into the fluid that can be detected by hydrophone receivers placed in the fluid-filled borehole. In fast formations, the shear headwave can be similarly excited by a compressional wave at the critical incidence angle $\theta_i = \sin^{-1}(V_f/V_c)$, where $V_f$ is the shear wave speed in the formation. In a homogeneous and isotropic model of fast formations, compressional and shear headwaves can be generated by a monopole source placed in a fluid-filled borehole for determining the formation compressional and shear wave speed (Kimball and Marzetta, 1984). It is known that refracted shear headwaves cannot be detected in slow formations (where the shear wave velocity is less than the borehole-fluid compressional velocity) with receivers placed in the borehole fluid. In slow formations, formation shear velocities are obtained from the low-frequency asymptote of borehole flexural dispersion. Standard processing techniques exist for the estimation of formation shear velocities in either fast or slow formations from an array recorded dipole waveforms. The radial depth of investigation in the case of headwave logging is dependent on the transmitter to receiver spacing and any in-situ radial variations in formation properties that might be present. The radial depth of investigation in the case of modal logging is well characterized and it extends to about a wavelength. This implies that the low- and high-frequencies probe deep and shallow into the formation, respectively. Existing sonic tools, such as the above-referenced "DSI" are capable of providing the far-field compressional, fast-shear, and slow-shear velocities away from the near-wellbore alterations.

The effective formation volume probed by borehole sonic waves is generally, subject to (1) near-wellbore stress distributions caused by the far-field formation stresses; (2) wellbore mud pressure; and (3) pore pressures. Formation stresses play an important role in geophysical prospecting and developments of oil and gas reservoirs. Both the direction and magnitude of these stresses are required in (a) planning for borehole stability during directional drilling, (b) hydraulic fracturing for enhanced production, and (c) selective perforation for prevention of sanding during production. A detailed knowledge of formation stresses also helps in management of reservoirs that are prone to subsidence caused by a significant reduction in pore pressure and an associated increase in the effective stress that exeeds the in-situ rock strength. In addition, the magnitude and orientation of the in-situ stresses in a given field have a significant influence on permeability distribution that help in a proper planning of wellbore trajectories and injection schemes for water or steam flooding. As estimates of stresses from borehole measurements are improved, it is not uncommon to find that the regional tectonic stress model involving large global averages is significantly different than the local stresses around a borehole that affects the reservoir producibility and near-wellbore stability.

The formation stress state is characterized by the magnitude and direction of the three principal stresses. Generally, the overburden stress yields the principal stress in the vertical direction. The overburden stress $(S_v)$ is reliably obtained by integrating the formation mass density from the surface to the dept of interest. Consequently, estimating the other two principal stresses ($S_{Hmax}$ and $S_{hmin}$) in the horizontal plane is the remaining task necessary to fully characterize the formation stress state. FIG. 1 shows various applications of the formation principal stresses together with the well bore ($P_p$) pressures in well planning, well bore stability and reservoir management.

The far-field formation stresses can be expressed in terms of three principal stresses—they are referred to as the overburden stress $S_v$, maximum horizontal stress $S_{Hmax}$, and minimum horizontal stress $S_{hmin}$ as shown in FIG. 2. It is known that the wellbore mud overpressure has rather small effect on borehole flexural velocities at low frequencies. In contrast, flexural velocities at low frequencies are more sensitive to changes in the far-field formation horizontal stresses.

Sonic velocities in formations change as a function of rock lithology/mineralogy, porosity, clay content, fluid saturation, stresses, and temperature. To estimate changes in the formation stress magnitudes from measured changes in sonic velocities, it is necessary to select a depth interval with a reasonably uniform lithology, clay content, saturation, and temperature so that the measured changes in velocities can be related to corresponding changes in formation stress magnitudes. Any change in porosity in the chosen depth interval is accounted for by corresponding changes in the formation effective bulk density and stiffnesses. Assuming that the measured changes in sonic velocities are largely caused by changes in stress magnitudes, it is possible to invert borehole sonic velocities for the estimation of changes in formation stress magnitudes (see U.S. Pat. No. 6,351, 991). These techniques neither require the presence of a wellbore failure in the form of a breakout or fractures, nor the in-situ rock tensile and compressive strengths. The technique is based on changes in velocities of multiple sonic waves caused by changes in prestress in the propagating medium. It is important to ascertain that one uses sonic velocities outside any mechanically altered annulus caused by borehole-induced stress concentrations and plastic deformations that might also occur.

The propagation of small amplitude waves in homogeneous and anitsotropic materials is described by the linear equations of motion. However, when the material is prestressed, the propagation of such waves are properly described by equations of motion for small dynamic fields superposed on a static bias. A static bias represents any statically deformed state of the medium caused by an externally applied load or residual stresses. The equations of nonlinear elasticity (see B. K. Sinha, "Elastic Waves In Crystals Under A Bias", Ferroelectrics, (41), 61–73, 1982; A. N. Norris, B. K. Sinha, and S. Kostek, "Acoustoelasticity Of Solid/Fluid Composite Systems", Geophys. J. Int., (118), 439–446, 1994). The linear equations of motion for isotropic materials contain two independent stiffnesses that are defined by the dynamic Young's modulus (Y) and Poisson's ratio (v) or equivalently, by the two Lame parameters, ($\lambda$ and $\mu$). The equations of motion or prestressed isotropic materials contain three additional nonlinear stiffness constants ($c_{111}$, $c_{144}$, and $c_{155}$).

SUMMARY OF THE INVENTION

Embodiments of the present invention include new techniques for the estimation of formation horizontal stresses. One of the techniques includes a multi-frequency inversion of cross-dipole dispersions for both the maximum and minimum horizontal stress magnitudes. A second technique involves inverting flexural velocity-dispersion gradients for estimating the isotropic horizontal stress in depth intervals with a reasonably uniform lithology. The second technique is, generally, applicable to shale intervals where dipole dispersion crossovers are not observed, implying isotropic horizontal stresses.

In accordance with an embodiment of the invention, a method is set forth for determining the maximum and minimum horizontal stresses of formations surrounding a borehole, including the following steps: suspending a logging device in the borehole; transmitting sonic energy from the logging device to establish flexural waves in the formations; receiving, at the logging device, sonic energy from the flexural waves, and producing, from the received sonic energy, measurement signals at a number of frequencies; determining, at said number of frequencies, the fast and slow flexural wave velocities in the formations, to obtain fast and slow flexural velocity dispersions; establishing a model of formation stresses in which stresses of a loaded state are represented by the sum of an omnidirectional hydrostatically loaded mean reference stress, a vertical stress perturbation, and maximum and minimum horizontal stress perturbations; establishing an inversion model that includes inputs from the fast and slow flexural velocity dispersions and also includes unknown horizontal perturbations of said model of formation stresses; deriving, from the inversion model, estimates of the maximum and minimum horizontal stress perturbations; and determining, from the estimates of the maximum and minimum horizontal stress perturbations and the mean reference stress, estimates of the maximum and minimum horizontal stresses of the formations.

A preferred form of this embodiment of the invention further includes the step of determining stress coefficients of the fast and slow flexural velocities as a function of frequency, and using the determined stress coefficients to obtain an estimate of said vertical stress perturbation. This form of the invention further includes deriving a reference flexural velocity dispersion, and the determination of the estimate of the vertical stress perturbation also depends on said reference flexural velocity dispersion. In this form, the inversion model includes differences between the fast and slow flexural velocity dispersions, normalized by the reference flexural velocity dispersion. The reference flexural velocity dispersion is derived from an assumed isotropic and homogeneous formation model which is, in turn, formulated using using measured monopole compresssional and shear velocities.

In accordance with a further embodiment of the invention, a method is set forth for determining isotropic horizontal stresses in a shale interval of formations surrounding a borehole, including the following steps: (a) suspending a logging device in the borehole; (b) transmitting sonic energy from the logging device to establish flexural waves in the formations; (c) receiving, at the logging device, sonic energy from the flexural waves, and producing, from the received sonic energy, measurement signals at a number of frequencies; (d) determining, at said number of frequencies, the flexural wave velocities in the formations, to obtain a flexural velocity dispersion; (e) performing the steps (a) through (d) at vertically spaced apart upper and lower depth levels in the shale region to obtain upper and lower flexural velocity dispersions; (f) establishing models of formation stresses at the upper and lower depth levels in which stresses of a loaded state are represented by the sum of an omnidirectional hydrostatically loaded mean reference stress, a vertical stress perturbation, and a horizontal stress perturbation; (g) establishing inversion models that include inputs from the upper and lower flexural velocity dispersions and also includes unknown vertical and horizontal perturbations of the model of formation stresses at the upper and lower depth levels; (h) deriving, from the inversion models, estimates of the vertical and horizontal stress perturbations at the upper and lower depth levels; and (i) determining, from the estimates of the vertical and horizontal stress perturbations at the upper and lower depth levels and the mean reference stress, estimates of the horizontal stress at the upper and lower depth levels in the shale interval of the formations.

Further features and advantages of the invention will become more readily apparent from the following detailed description when taken in conjunction with the accompanying drawings.

DETAILED DESCRIPTION

Figure 1:
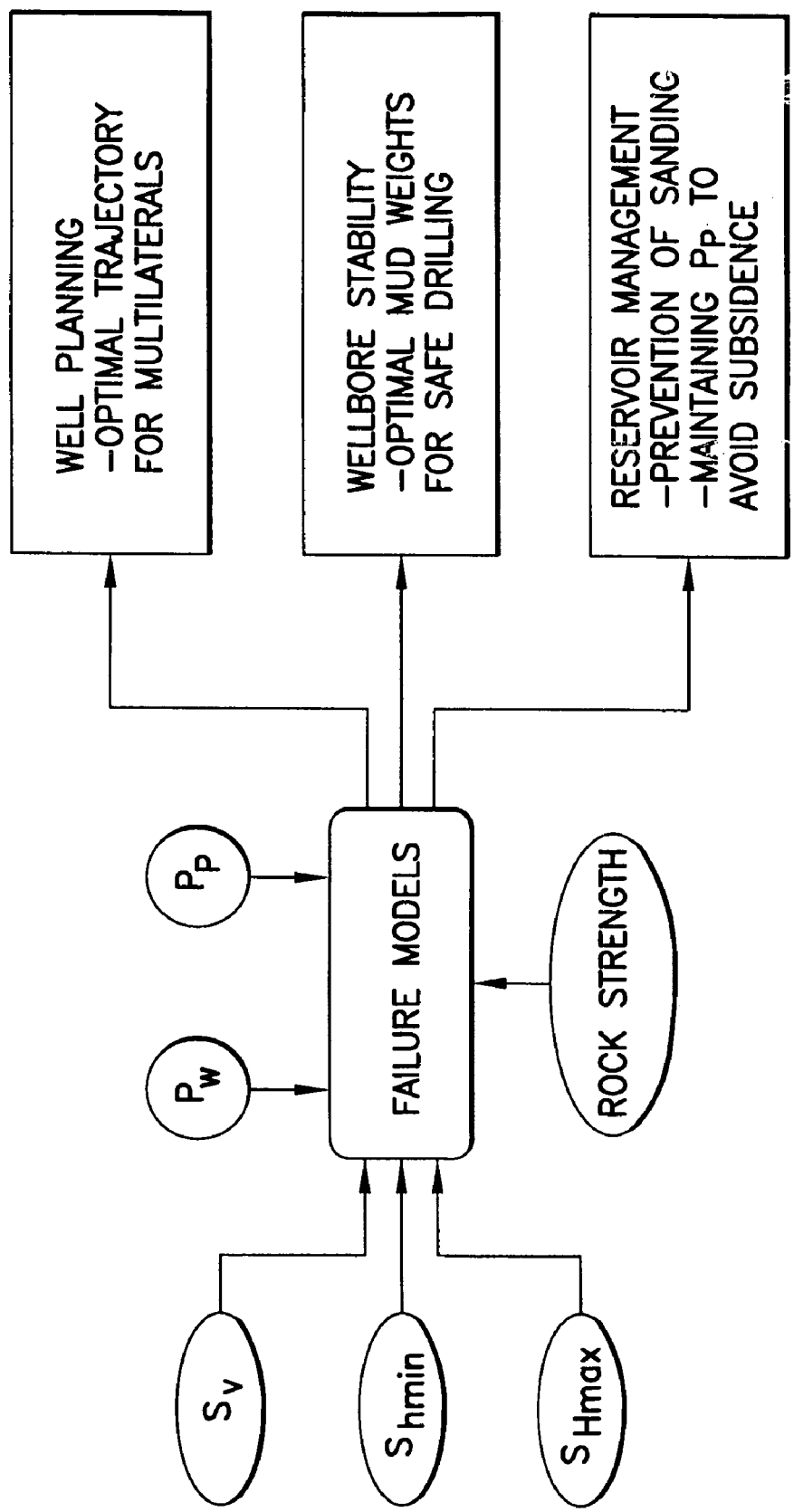
FIG. 1 is a diagram illustrating applications of formation stresses in well planning, wellbore stability and reservoir management.
Figure 2:
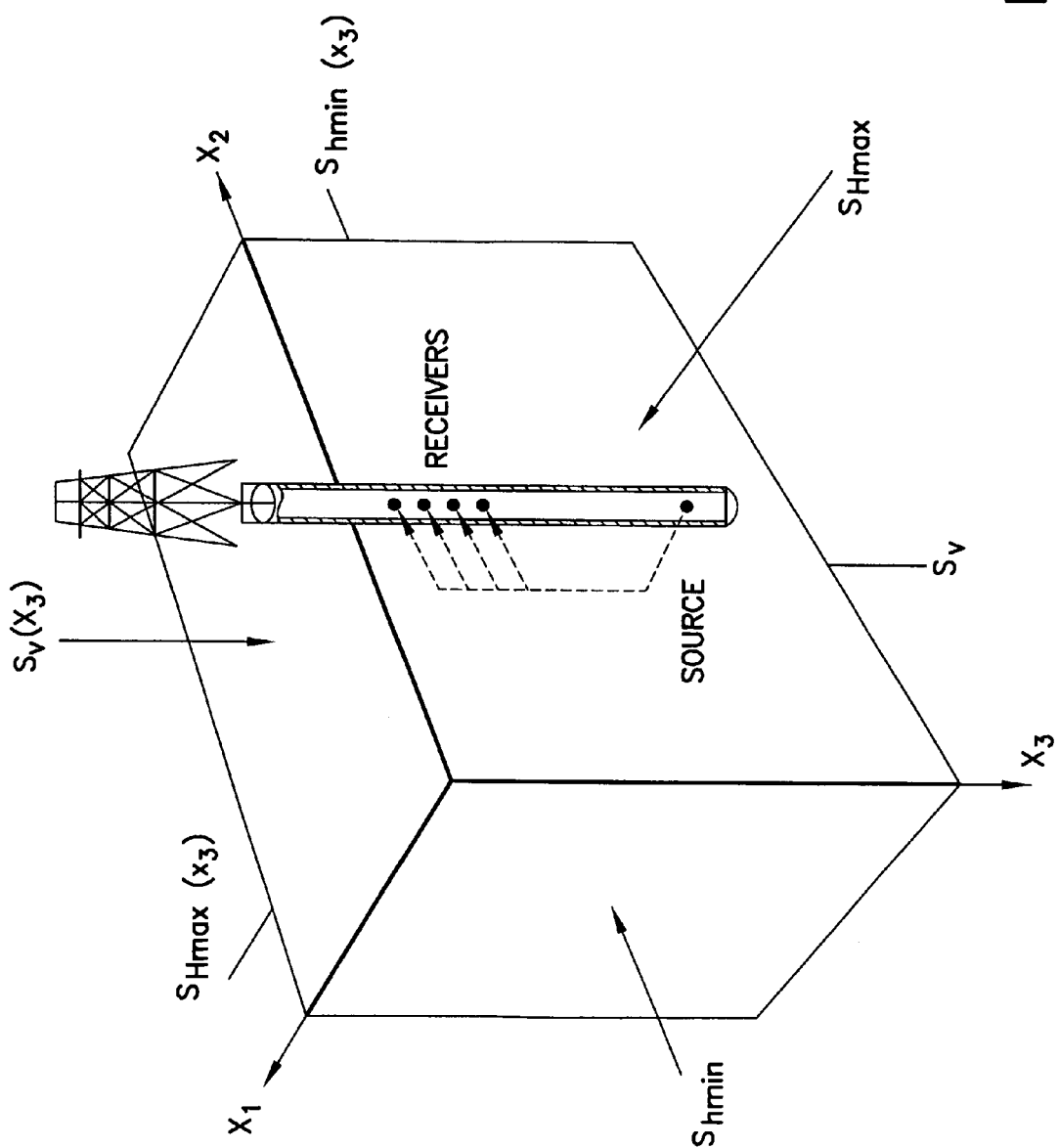
FIG. 2 is a schematic diagram of a borehole in the presence of formation principal stresses. The three principal stresses are assumed to be different.
Figure 3:
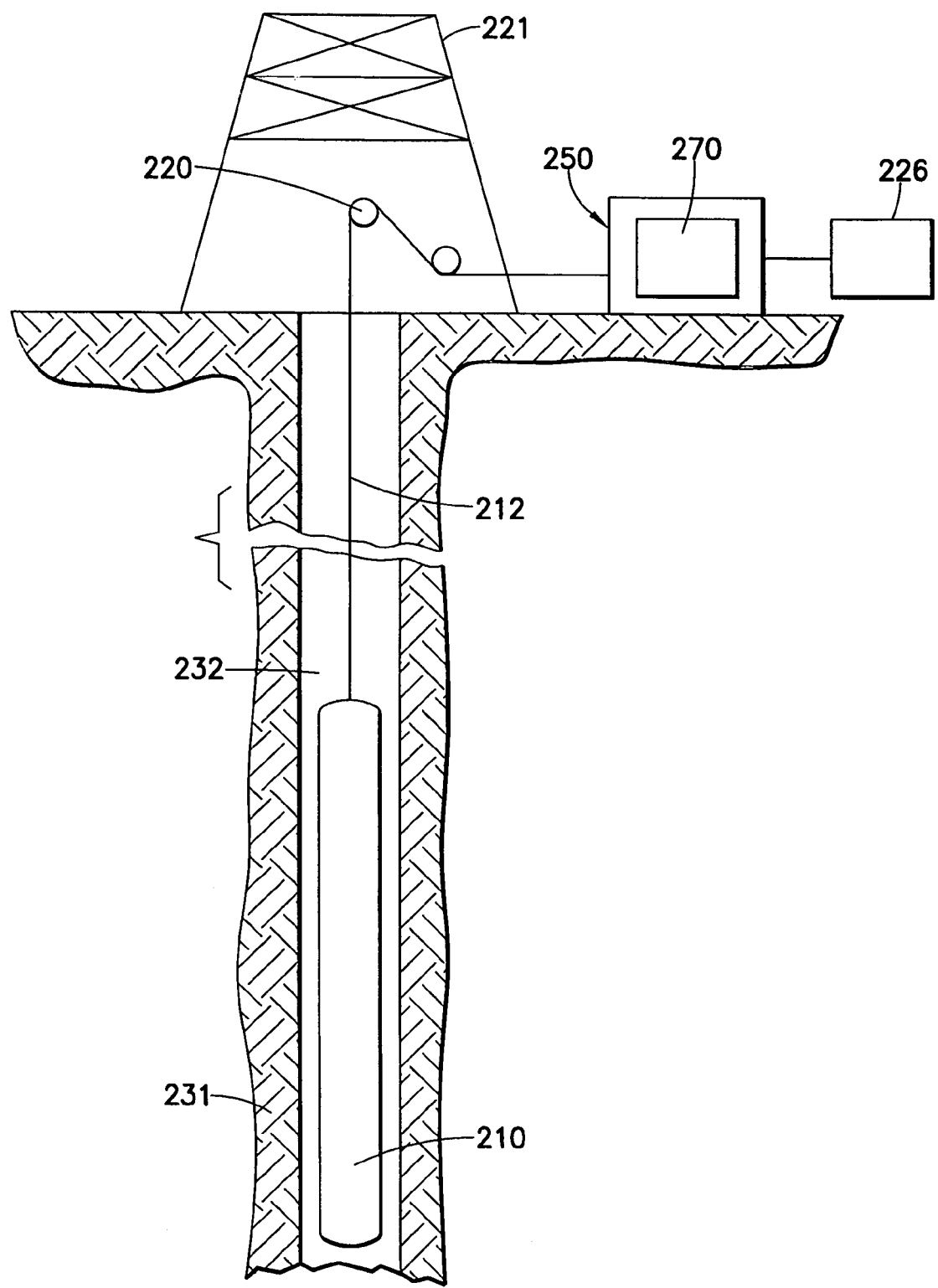
FIG. 3 is a diagram, partially in block form, of a type of apparatus that can be used in practicing embodiments of the invention.

Referring to FIG. 3, there is shown a type of apparatus which can be used in practicing embodiments of the invention. Subsurface formations 231 are traversed by a borehole 232 which is typically, although not necessarily, filled with drilling fluid or mud. A logging tool 210 is suspended on an armored cable 212 and may have optional centralizers (not shown). The cable 212 extends up the borehole, over a sheave wheel 220 on a derrick 221 to a winch forming part of surface equipment 250. Known depth gauging apparatus (not shown) is provided to measure cable displacement over the sheave wheel 220 and accordingly the depth of the logging tool 210 in the borehole 232. A device of a type well known in the art is included in the tool 210 to produce a signal indicative of orientation of the body of the tool 210. Processing and interface circuitry within the tool 210 amplifies, samples and digitizes the tool's information signals for transmission and communicates them to the surface equipment 250 via the cable 212. Electrical power and control signals for coordinating operation of the tool 210 are generated by the surface equipment 250 and communicated via the cable 212 to circuitry provided within the tool 210. The surface equipment includes processor subsystem 270 (which can typically include a microprocessor, memory, clock and timing, and input/output functions—not separately shown), standard peripheral equipment (not separately shown), and recorder 226.

Figure 4:
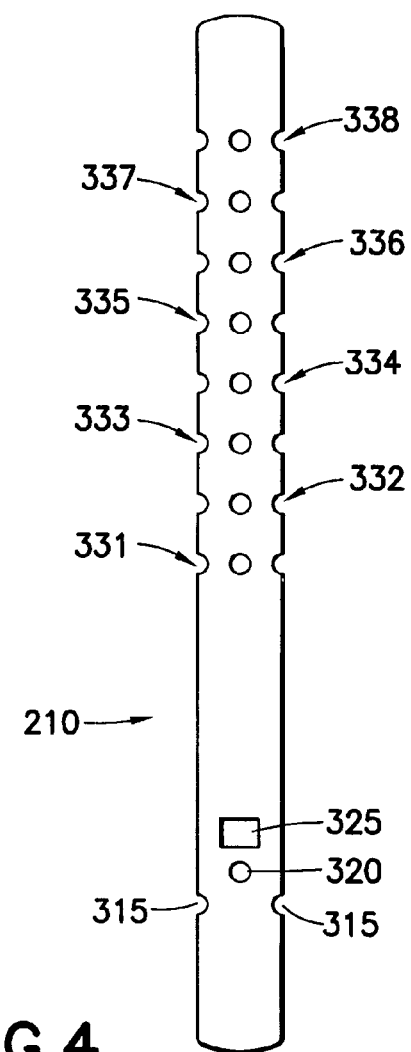
FIG. 4 is a simplified diagram of a type of downhole logging device that can be used in practicing embodiments of the invention.
Figure 5:
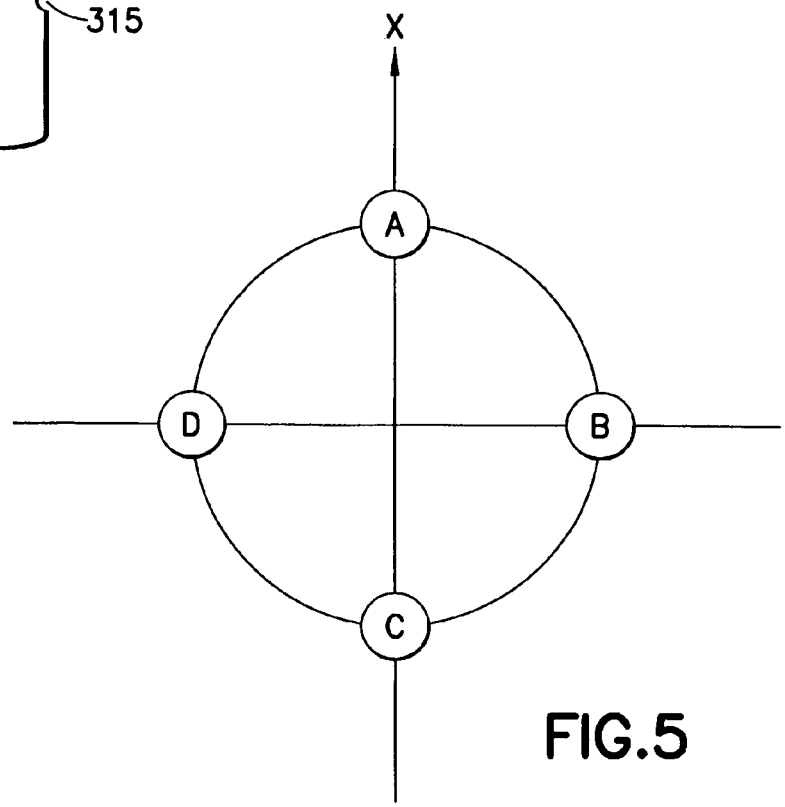
FIG. 5 is a diagram illustrating, in cross-section, the placement of hydrophones that can be used at a receiver station in the logging device of FIG. 4.

The logging device 210 may be, for example, of a type first noted above and known as a Dipole Shear Sonic Imager ("DSI"—trademark of Schlumberger), generally described in Harrison et al., "Acquisition and Analysis of Sonic Waveforms From a Borehole Monopole and Dipole Source for the Determination of Compressional and Shear Speeds and Their Relation to Rock Mechanical Properties and Surface Seismic Data", Society of Petroleum Engineers, SPE 20557, 1990. It will be understood, however, that any suitable logging device can be utilized. Further details of the logging device 210 of this example are shown in FIG. 4. The logging device 210 includes crossed dipole transmitters 315 and 320 (only one end of dipole 320 being visible) and a monopole transmitter 325, so that waves including compressional, shear, Stoneley, and flexural can be excited. Orthogonal transmitter dipoles are preferred in an embodiment hereof that employs two pairs of transmitter dipoles, but transmitter dipoles at a known non-zero angle that is not a right angle can also be used. As seen in the illustration, the DSI orthogonal dipole transmitters of this example are not collocated, although they could be. The present invention can make use of either non-collocated or collocated orthogonal dipole transmitters without any loss of generality. Eight, or other suitable number, of spaced apart receiver stations, designated 331 through 338 each comprise four receiver hydrophones mounted azimuthally at ninety degree intervals in the surface of the cylindrical logging device. FIG. 5 shows the hydrophones, designated A, B, C, and D. In an example shown in FIG. 6, an X component can be obtained by subtracting the signals received at A and C (i.e., A–C), and a Y component can be obtained by subtracting the signals received at B and D (i.e., B–D). With four receiver elements at each receiver station, there are a total of thirty-two receiver elements in this example. The receiver stations are also configurable for monopole reception.

The transmitter electronics contain a power amplifier and switching circuitry capable of driving the two crossed-dipole transmitter elements and the monopole element from a programmable waveform. Separate waveforms with appropriate shape and frequency content can be used for dipole, Stoneley and compressional measurements. The receiver electronics processes the signals from the 32 individual receiver elements located at the eight receiver stations which are spaced six inches apart. At each station, four receivers are mounted as shown in FIG. 5 which allows measurement of the dipole and crossed-dipole waveforms by differencing the outputs from opposite receivers, as previously described. Summing the outputs of the receivers can be used to produce a monopole equivalent signal. As further described in Harrison et al., supra, the receiver electronics multiplexers, filters, amplifies and channels the signals from the 32 receiver elements to eight parallel signal paths. These eight parallel analog signals are passed to an acquisition electronics cartridge where eight 12-bit analog-to-digital converters digitize the signals from the receiver electronics. The telemetry circuitry passes the digitized information to the earth's surface.

Figure 6:
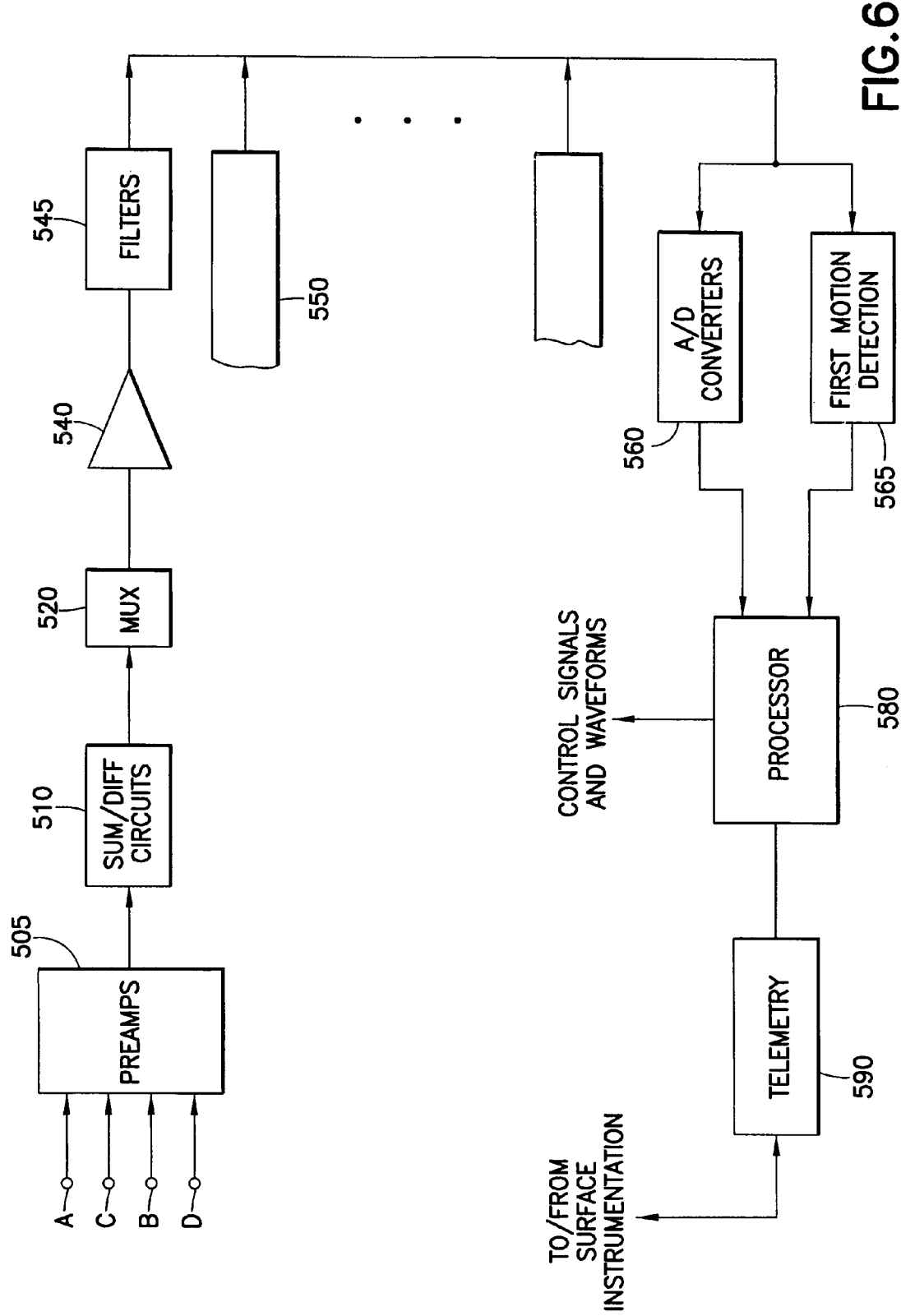
FIG. 6 is a block diagram of a portion of the electronics of the FIG. 4 logging device.

FIG. 6 shows an example of the acquisition signal path in block diagram for for one of the eight (or other suitable number of) receiver stations, as described in Harrison et al., supra. Each receiver has its own charge preamplifier (represented at 505). The output of the receivers, odd numbered pairs being in-line with the upper dipole transmitter and even numbered pairs with the lower dipole transmitter, passes into both a summing circuit (for monopole measurements) and a differencing circuit (for dipole measurements), as represented at 510. Under software control the sum or difference is selected by a multiplexer stage (block 520) and the signal passed to one of eight programmable gain amplifier stages (540) and filters (545). The other similar channels are represented by block 550. The eight parallel analog signals are passed to eight parallel 12-bit A/D converters (represented at 560) where simultaneous waveform digitization is performed. If desired, more bits can, of course, be used to advantage. After digitization, the eight waveforms are passed to the memory section associated with downhole processor 580. The processor also provides control signals and waveforms to transmitter and receiver electronics. An alternate path directs the eight analog receiver signals into threshold crossing detection circuitry or digital first motion detection, as represented at block 565. This circuitry detects the time of all up or down going threshold crossings. The digitized waveform data and the threshold crossing time data are passed to the surface using telemetry circuitry 590. It will be understood that more advanced tool implementations, having additional transmitters, receivers, and/or transmitter-to-receiver (T/R) spacings, and more powerful processing capabilities, can be used even more advantageously, consistent with the principles hereof, in practicing embodiments of the invention.

In the FIG. 4 embodiment, the processing of signals recorded uphole can be implemented using a processor 270, such as a suitably programmed general purpose digital processor with memory and peripherals conventionally provided. It will be understood, however, that the processing need not be performed at the wellsite, and that signals derived at the wellsite can be processed at a remote location. It will also be understood that other suitable logging tools can be employed in practicing the invention.

Elastic wave velocities in porous materials change as a function of effective stresses in the propagating medium. These effective stresses $\sigma_{ij}$ are defined (see Nur and Byerlee, "An Exact Effective Stress Law For Elastic Deformation of Rock With Fluids", Journal of Geophysical Research, vol. 76, pp. 6414–6419, 1971) by $$\sigma_{ij} = S_{ij} - \alpha \delta_{ij} P_p, \tag{1}$$

where $\delta_{ij}$ is the Kronecker delta and the Biot parameter a is given by $$\alpha = 1 - \frac{K}{K_s}, \tag{2}$$

where K is the bulk modulus of the dry aggregate and $K_S$ is the intrinsic bulk modulus of the solid matrix. Even though the porosity effect is not explicit in this expression, it is included in the value of the effective bulk modulus K of the dry aggregate. In the case of a nonporous and impermeable formation, $K \approx K_S$, and $\alpha = 0$. In contrast, in natural soils, $K << K_S$, and $\alpha = 1$. In porous rocks, the Biot parameter is affected by both the porosity, pore shape, and connectivity (see Walsh, "The Effects of Cracks on The Compressibility of Rocks", Journal of Geophysical Research, vol. 70, p. 381, 1965). Generally, $\Phi < \alpha < 1$, in porous rocks with porosity $\Phi$. More importantly, the Biot parameter $\alpha_n$ in a normally compacted shale formation with open pores is typically more than that in an overpressured ($\alpha_o$) shale with larger effective porosity and closed pores, i.e., $\alpha_n > \alpha_o$.

Figure 7:
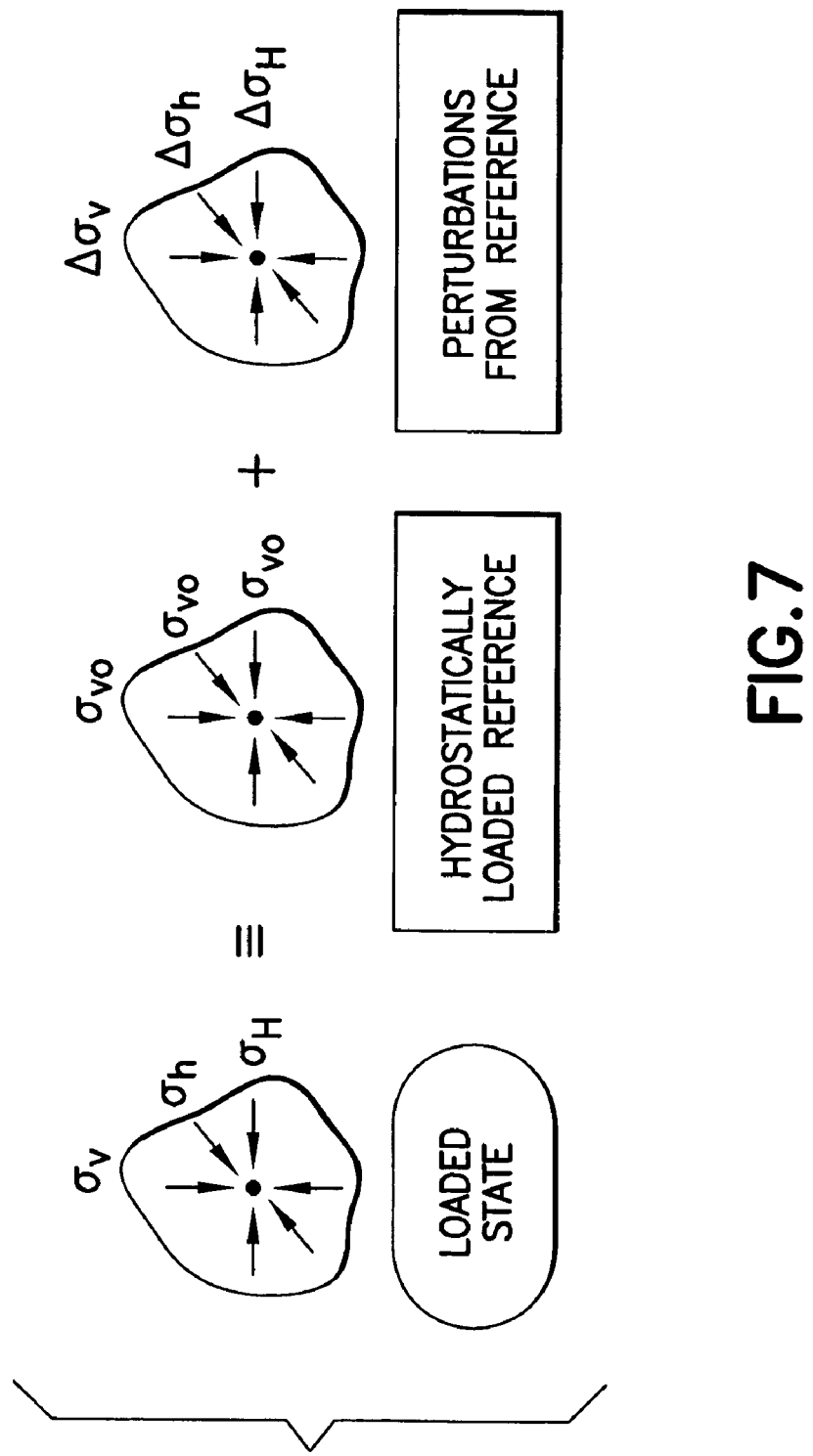
FIG. 7 illustrates a model of decomposition of formation effective stresses in the far-field away from the borehole into a hydrostatically loaded reference and perturbations of tri-axial stresses.

Consider a vertical fluid-filled borehole with its axis parallel to the $X_1$-direction, and the maximum and minimum horizontal stresses parallel to the $X_2$- and $X_3$-directions, respectively. Triaxial formation stresses with a vertical overburden stress as one of the principal stresses can be decomposed into a hydrostatically loaded isotropic reference and perturbations in the three principal stresses $\Delta\sigma_V$, $\Delta\sigma_H$, and $\Delta\sigma_h$, as shown in FIG. 7. Note that the mean stress $\sigma_{vo}$ in the isotropic reference state is not known at this point. However, this assumed state is defined from the measured compressional and monopole shear velocities at the chosen depth so that small perturbations in the three principal stresses $\Delta\sigma_V$, $\Delta\sigma_H$, and $\Delta\sigma_h$, would lead to the actual in-situ stresses at this depth. All of these stresses in FIG. 7 are far-field stresses beyond any stress-concentration annulus caused by the presence of a borehole.

When the propagating medium is prestressed, the propagation of small-amplitude waves are properly described by equations of motion for small dynamic fields superposed on a prestressed state. A prestressed state represents any statically deformed state of the medium caused by an externally applied load or residual stresses. The equations of motion for small dynamic fields superposed on a static bias are derived from the rotationally invariant equations of nonlinear elasticity by making a Taylor expansion of the quantities for the dynamic state about their values in the biasing (or intermediate) state (see N. Norris, B. K. Sinha, and S. Kostek, "Acoustoelasticity Of Solid/Fluid Composite Systems", Geophys. J. Int., (118), 439–446, 1994; B. K. Sinha and S. Kostek, "Stress-induced Azimuthal Anisotropy In Borehole Flexural Waves", Geophysics, (61) 6, 1899–1907, 1996).

When the biasing state is inhomogeneous, the effective elastic constants are position dependent, and a direct solution of the boundary value problem is not possible. In this situation, a perturbation procedure can readily treat spatially varying biasing states, such as those in the case of nonuniform radial and circumferential stress distributions away from the borehole, and the corresponding changes in the Stoneley and flexural-wave velocities can be calculated as a function of frequency (Norris et al., 1994, supra; Sinha et al., 1995, supra). Referenced to the statically deformed state of the formation (or the intermediate configuration), the modified Piola-Kirchhoff stress tensor $P_{\alpha j}$ as defined in Norris et al. 1994, supra, can be employed in a perturbation model to obtain the following expression for the first-order perturbation in the eigenfrequency $\omega_m$ for a given wavenumber $k_z$, $$\frac{\Delta \omega}{\omega_m} = \frac{\int_V \Delta P_{\alpha j} u_{j,\alpha}^m dV - \omega_m^2 \int_V \Delta \rho u_j^m u_j^m dV}{2\omega_m^2 \int_V \rho_o u_j^m u_j^m dV}, \text{ where} \quad (3)$$

$$\Delta P_{\alpha j} = H_{\alpha j \gamma \beta} u_{\gamma,\beta}^m, \quad (4)$$

$$H_{\alpha j \gamma \beta} = h_{\alpha j \gamma \beta} + T_{\alpha \beta} \delta_{j\gamma} + \Delta P_W (\delta_{\alpha j} \delta_{\gamma \beta} - \delta_{\alpha \gamma} \delta_{j\beta}), \quad (5)$$

$$h_{\alpha j \gamma \beta} = -c_{\alpha j \gamma \beta} w_{\delta,\delta} + c_{\alpha j \gamma \beta AB} E_{AB} + w_{\alpha,L} c_{Lj\gamma\beta} + w_{j,M} c_{\alpha M \gamma \beta} + w_{\gamma,P} c_{\alpha j P \beta} + w_{\beta,Q} c_{\alpha j \gamma Q}, \quad (6)$$

$$T_{\alpha \beta} = c_{\alpha \beta \gamma \delta} w_{\delta,\gamma}, \quad (7)$$

$$E_{AB} = \frac{1}{2}(w_{A,B} + w_{B,A}). \quad (8)$$

Equations (3)–(8) use the Cartesian tensor notion and the convention that a comma followed by an index P denotes differentiation with respect to the spatial coordinate $X_p$. The summation convention for repeated tensor indices is also implied. Although $h_{\alpha j\gamma\beta}$ exhibits the usual symmetries of the second-order constants of linear elasticity, the effective elastic stiffness tensor $H_{\alpha j\gamma\beta}$ does not have these properties as is evident from equation (5). Before discussing the various quantities in equations (3)–(8), it is noted that the present position of material points may be written as $$y(X,t)=X+w(X)+u(X,t), \quad (9)$$

where w denotes the displacement caused by the applied static loading of material points with position vector X in the assumed reference isotropic state (also defined as the reference state), and u denotes the small dynamic displacement vector of material points above and beyond that due to the static deformation. The small field Piola-Kirchhoff stress $P_{\alpha j}$ in the intermediate state can be decomposed into two parts $$P_{\alpha j} = P_{\alpha j}^L + \Delta P_{\alpha j}, \quad (10)$$

where $$P_{\alpha j}^L = c_{\alpha j \gamma \beta} u_{\beta,\gamma}^m, \quad (11)$$

with $\Delta P_{\alpha j}$ being defined by equations (4)–(8), and the superscript "L" denoting the linear portion of the stress tensor. The quantities $c_{\alpha j\gamma\beta}$ and $c_{\alpha j\gamma\beta AB}$ are the second- and third-order elastic constants, respectively. Generally, the second-order and third-order elastic constants are written in Voigt compressed notation whereby a pair of indices is replaced by a single index that take on values from 1 to 6 following the notation: $11 \rightarrow 1$, $22 \rightarrow 2$, $33 \rightarrow 3$, $23 \rightarrow 4$, $13 \rightarrow 5$, and $12 \rightarrow 6$. In equations (5)–(8), $T_{\alpha\beta}$, $E_{AB}$, and $w_{\delta,\gamma}$ denote the biasing stresses, strains, and (static) displacement gradients, respectively. Note that the biasing stress $T_{\alpha\beta}$ in the propagating medium is expressed in terms of the far-field formation principal stresses ($S_V$, $S_H$, and $S_h$) using standard relations that account for stress concentrations caused by the presence of a borehole. In equation (3), $\Delta P_{\alpha j}$ are the perturbations in the Piola-Kirchhoff stress tensor elements from the linear portion, $P_{\alpha j}^L$, for the reference isotropic medium before the application of any biasing stresses, $\rho_o$ is the mass density of the formation in the reference state, $u_j^m$ represents the eigensolution for the reference isotropic medium for a selected propagating mode. The index m refers to a family of normal modes for a borehole in an isotropic formation. The quality $\Delta P_W$ in equations (5) denotes the increase in the wellbore pressure. The frequency perturbations $\Delta \omega$ are added to the eigenfrequency $\omega_m$ for various values of the wavenumber along the borehole axis $k_z$, to obtain the final dispersion curves for the biased state. Note that a fractional chance in eigenfrequency from a reference state is equal to a fractional change in phase velocity at a given axial wavenumber. Although this method of solution is valid for all modes, analyzed herein are stress-induced effects only on the Stoneley (m=0) and flexural (m=1) modes. The volume integrals as shown in equation (3) are computed in the statically deformed configuration of the borehole.

A general perturbation model as defined by equation (3), relates perturbations from a chosen reference state in the three principal formation stresses ($\Delta\sigma_V$, $\Delta\sigma_H$, and $\Delta\sigma_h$) to fractional changes in the borehole Stoneley and flexural velocities at a given wavenumber $k_i$ by $$\left(\frac{\Delta V_m^{F,S}}{V_m^R}\right)_i = \left(\frac{\partial V_m^{F,S}}{V_m^R \partial \sigma_V}\right)_i \Delta\sigma_V + \left(\frac{\partial V_m^{F,S}}{V_m^R \partial \sigma_H}\right)_i \Delta\sigma_H + \left(\frac{\partial V_m^{F,S}}{V_m^R \partial \sigma_h}\right)_i \Delta\sigma_h, \quad (12)$$

where the stress-coefficient of velocity at a given wavenumber $k_i$ is given by $$\left(\frac{\partial V_m^{F,S}}{V_m^R \partial \sigma_j}\right)_i w = w_{1mj}^i + w_{2mj}^i \frac{c_{111}}{\mu} + w_{3mj}^i \frac{c_{155}}{\mu} + w_{4mj}^i \frac{c_{144}}{\mu}, \quad (13)$$

and the subscript m denotes one of the borehole modes (m=1→fast-flexural; m=2→slow-flexural; and m=3→Stoneley), and the index j represents one of the three principal stresses $\sigma_V$, $\sigma_H$, and $\sigma_h$ (j=1→$\sigma_V$; j=2→$\sigma_H$; and j=3→$\sigma_h$). The superscripts F and S, respectively, denote the fast- and slow-flexural wave velocities; and R refers to the flexural wave velocity in the chosen reference state. The fast- and slow-flexural waves have radial polarization parallel and perpendicular to the maximum horizontal ($\sigma_H$) stess direction, respectively. The four coefficients $w_{1mj}^i$, $w_{2mj}^i$, $w_{3mj}^i$, and $w_{4mj}^i$, are perturbation integrals evaluated in terms of modal solutions at a given wavenumber $k_i$ in the reference state. $c_{111}$, $c_{155}$, and $c_{144}$ are the three independent formation nonlinear constants and $\mu$ is the shear modulus in the reference state.

The shear modulus in the reference state is determined from the Stoneley velocity log calculated at a rather low frequency which is close to the tube wave velocity at a reference depth A from the following relationship $$\mu = \frac{\rho_{f,A} V_{f,A}^2}{V_{f,A}^2 / V_{ST,A}^2 - 1}, \quad (14)$$

where $\rho_{f,A}$ is the mud density at depth A; $V_{f,A}$, and $V_{ST,A}$ are the mud compressional velocity and Stoneley velocity at depth A, respectively. The compressional modulus ($\lambda+2\mu$) is obtained from the formation compressional velocity at depth A from the relationship $$\lambda+2\mu=\rho_{b,A}V_{C,A}^2. \quad (15)$$

The dynamic Young's modulus and Poisson's ratio can be readily obtained from the Lame parameters ($\lambda$ and $\mu$) or the compressional and shear velocities in the chosen isotropic reference state.

Figure 14A:
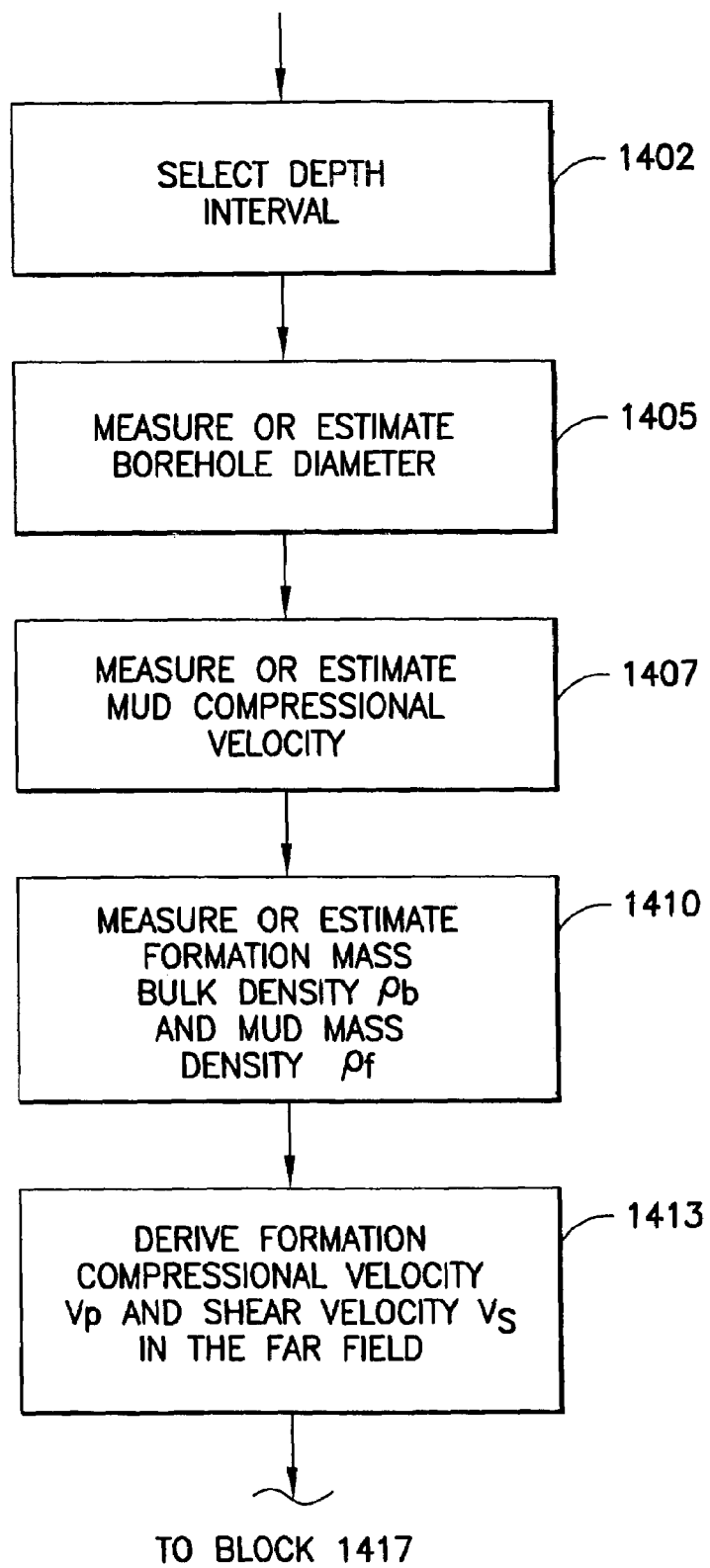
FIGS. 14A and 14B, and 14C, when placed one beneath another, show a flow diagram of a routine for programming a processor to implement an embodiment of the invention.
Figure 14B:
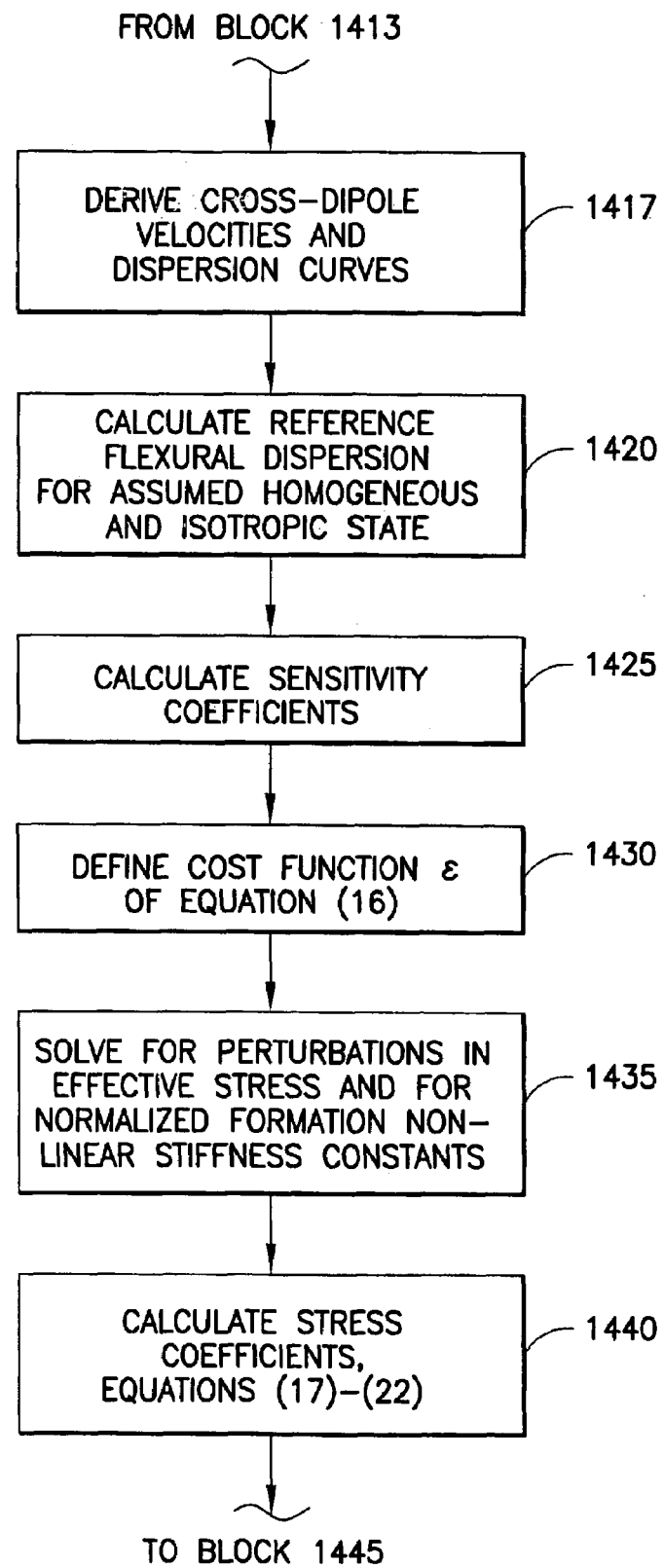
Figure 14C:
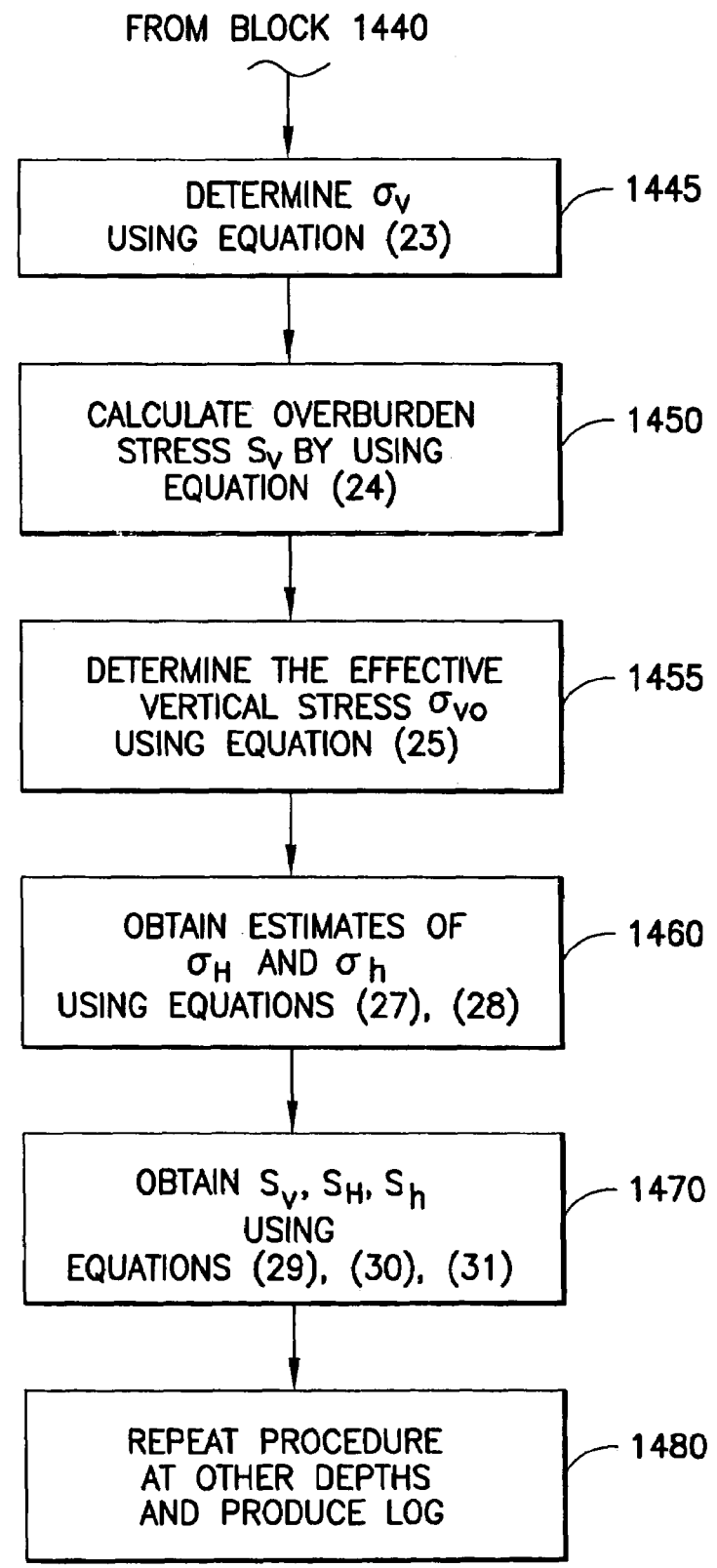

FIG. 14 is a flow diagram of a routine for practicing an embodiment of the invention for determining estimates of maximum horizontal stress magnitude $S_H$. This embodiment has particular application when cross-dipole waveforms produce wideband dispersions (for example, n the range 1 to 6 kHz) exhibiting crossovers. A processor, programmed consistent with the routine may be, for example, the processor 270 of the surface equipment of FIG. 3 or a remote processor. If desired, a downhole processor could also perform at least part of the technique. Data may, for example, be collected and stored using the type of logging apparatus described in conjunction with FIGS. 3–6, although it will be understood that other suitable equipment can be utilized. In an example for the present embodiment, a depth interval of reasonably uniform lithology is utilized. The borehole diameter, d, is measured, for example with a caliper tool. The borehole fluid (mud) compressional velocity, $V_f$, is measured, or can be estimated from the mud composition, mass density, in-situ pressure and temperature, as is known in the art. The formation mass bulk density, $\rho_b$, and the mud mass density, $\rho_f$, are measured or estimated, as is known in the art. For example, the formation mass bulk density can be obtained, for example, from neutron-density logging measurements, and the mud mass density can be derived using mud weight information from the drilling fluid supplier.

The compressional velocity $V_p$ and shear velocity $V_s$ of the substantially undisturbed formation (that is, the relatively far-field region outside any mechanically altered annulus) are obtained, for example, from a standard type of sonic log (see, for example, Harrison et al., "Acquisition and Analysis of Sonic Waveforms From a Borehole Monopole and Dipole Source for the Determination of Compressional and Shear Speeds and Their Relation to Rock Mechanical Properties and Surface Seismic Data", Society of Petroleum Engineers, SPE 20557, 1990). Flexural wave velocities are determined at a number of frequencies so that dispersion curves for orthogonal directions can be developed at depth levels of interest.

In the flow diagram of FIG. 14, the block 1402 represents selection of a depth interval having reasonably uniform lithology, and where cross-dipole dispersions exhibit a crossover. The block 1405 represents the measurement or estimation of borehole diameter, for example using a caliper tool (in the same or a separate logging run). As represented by the blocks 1407 and 1410 the mud compressional velocity $V_f$, and the mud mass density $\rho_f$ and formation mass bulk density $\rho_b$, are measured or estimated, as previously described. The far-field formation compressional velocity $V_p$ and shear velocity $V_s$ are then derived, as represented by the block 1413. These can be measured, in conventional fashion, using the sonic logging tool, at a relatively long transmitter-to-receiver spacing, to obtain these measurements in the far field which are substantially unaffected by damage caused by the drilling of the borehole. Alternatively, these and other parameters can be input if they are available from another source. The block 1417 represents the determination, at the present depth, of the cross-dipole flexural wave velocities at a number of frequencies and the development of the fast and slow cross-dipole dispersion curves, in known manner.

Next, as represented by the block 1420, at the present depth, a reference flexural dispersion is computed for an assumed isotropic and homogeneous state from the measured $V_P$, monopole shear $V_S$, formation bulk mass density $\rho_b$, mud mass density $\rho_f$, mud compressional velocity $V_f$, and borehole radius a. Reference can be made, for example, to B. K. Sinha, "Sensitivity and Inversion of Borehole Flexural Dispersions for Formation Parameters", Geophysical Journal international, Vol. 128(1), pp. 84–96, January 1997. If the monopole shear velocity is not available from the measurements, it can be estimated from the Stoneley (tube-wave) velocity ($V_T$) and mud compressional velocity $V_f$. The reference flexural dispersion is for a borehole in an hydrostatically loaded formation subject to a mean compressive stress $\sigma_{vo}$, which is an unknown at this point. FIG. 7 illustrates decomposition of formation effective stresses in the far-field into a hydrostatically loaded reference and perturbations of triaxial stresses. Given the overburden stress $\sigma_v$ at the chosen depth, a goal of the inversion is to estimate the mean hydrostatic stress $\sigma_{vo}$ together with the perturbations in the three principal stresses.

Figure 8:
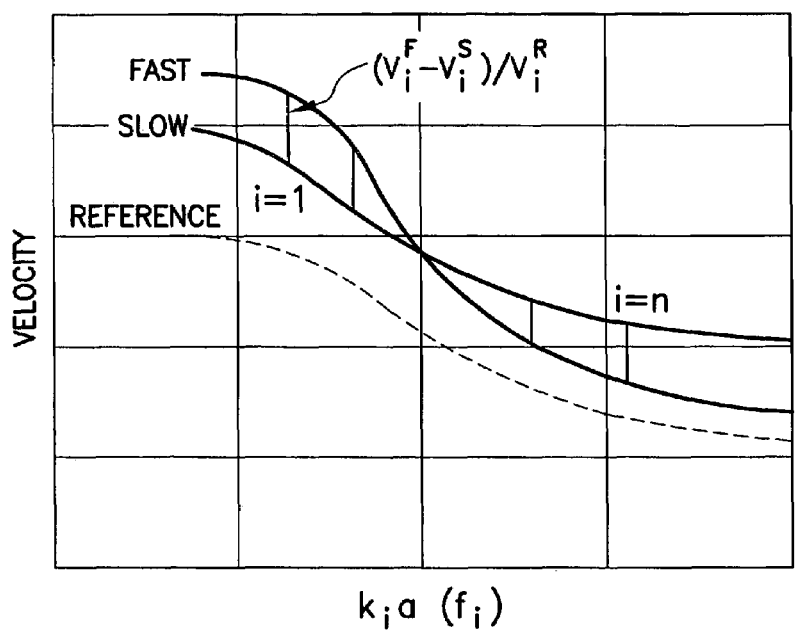
FIG. 8 is a graph of an example of the fast-, slow-, and reference flexural velocity dispersions. Normalized differences between the fast- and slow-flexural velocities at various wavenumbers are input to the inversion model for the estimation of formation nonlinear constants and $\Delta\sigma_H$ and $\Delta\sigma_h$. $k_i$ is the axial wavenumber, and a is the borehole radius. The index i denotes the number of input velocity $V_i$ and frequency $f_i$ used in the inversion model.

The block 1425 represents calculating of the sensitivity coefficients $w_{1mj}^i$, $w_{2mj}^i$, $w_{3mj}^i$, and $w_{4mj}^i$ as a function of wavenumber $k_i$, for both the fast and slow flexural waves in the previously chosen reference state of block 1420. These coefficients are calculated in terms of the flexural wave eigensolution in the reference state and the near-wellbore stress distributions caused by either the maximum horizontal stress parallel (referred to as the fast-flexural) or perpendicular (referred to as the slow-flexural) to the radial polarization of the flexural wave. A cost function, $\epsilon$, is defined (block 1430) from differences in the fast- and slow-flexural velocities and sensitivity coefficients at various wavenumbers $k_i$, and known perturbations in stress magnitudes $\Delta\sigma_H$ and $\Delta\sigma_h$. FIG. 8 shows the velocity differences as a function of wavenumber that are needed in the expression for the cost function $\epsilon$ given as:

$$\varepsilon = \sum_{i=1}^{n} \frac{(V_i^F - V_i^S)}{V_i^R} - $$
$$(w_{112}^j - w_{122}^j)\Delta\sigma_H - (w_{122}^j - w_{222}^j)\frac{c_{111}}{\mu}\Delta\sigma_H -$$
$$(w_{312}^j - w_{322}^j)\frac{c_{155}}{\mu}\Delta\sigma_H - (w_{421}^j - w_{422}^j)\frac{c_{144}}{\mu}\Delta\sigma_H -$$
$$(w_{113}^j - w_{123}^j)\Delta\sigma_h - (w_{213}^j - w_{233}^j)\frac{c_{111}}{\mu}\Delta\sigma_h -$$
$$(w_{313}^j - w_{323}^j)\frac{c_{155}}{\mu}\Delta\sigma_h - (w_{413}^j - w_{423}^j)\frac{c_{144}}{\mu}\Delta\sigma_h, \quad (16)$$

where i=1, 2, 3, . . . n, are the axial wavenumbers (or frequencies) where the measured velocity differences ($V_i^F - V_i^S$)/$V_i^R$ are calculated. The block 1435 represents solving for the perturbations in effective stresses $\Delta\sigma_H$ and $\Delta\sigma_h$ that would be needed to attain the actual loaded state of the formation in the far-field at the chosen depth. In addition to the two stress magnitudes, $c_{111}/\mu$, $c_{155}/\mu$, and $c_{144}/\mu$ are also solved from a nonlinear least-squares minimization of the cost function $\epsilon$ as defined by equation (16). Then, as represented by the block 1440, the stress coefficients of the fast and slow flexural velocities are calculated as a function of axial wavenumber or frequency defined by $$\frac{\partial V_i^F}{V_i^R \partial \sigma_V} = w_{111}^j + w_{211}^j \frac{c_{111}}{\mu} + w_{311}^j \frac{c_{155}}{\mu} + w_{411}^j \frac{c_{144}}{\mu}, \quad (17)$$

$$\frac{\partial V_i^F}{V_i^R \partial \sigma_H} = w_{112}^j + w_{212}^j \frac{c_{111}}{\mu} + w_{312}^j \frac{c_{155}}{\mu} + w_{412}^j \frac{c_{144}}{\mu}, \quad (18)$$

$$\frac{\partial V_i^F}{V_i^R \partial \sigma_h} = w_{113}^j + w_{213}^j \frac{c_{111}}{\mu} + w_{313}^j \frac{c_{155}}{\mu} + w_{413}^j \frac{c_{144}}{\mu}, \quad (19)$$

$$\frac{\partial V_i^S}{V_i^R \partial \sigma_V} = w_{121}^j + w_{221}^j \frac{c_{111}}{\mu} + w_{321}^j \frac{c_{155}}{\mu} + w_{421}^j \frac{c_{144}}{\mu}, \quad (20)$$

$$\frac{\partial V_i^S}{V_i^R \partial \sigma_H} = w_{122}^j + w_{222}^j \frac{c_{111}}{\mu} + w_{322}^j \frac{c_{155}}{\mu} + w_{422}^j \frac{c_{144}}{\mu}, \quad (21)$$

$$\frac{\partial V_i^S}{V_i^R \partial \sigma_h} = w_{123}^j + w_{223}^j \frac{c_{111}}{\mu} + w_{323}^j \frac{c_{155}}{\mu} + w_{423}^j \frac{c_{144}}{\mu}, \quad (22)$$

where the superscripts F and S denote the fast- and slow-flexural waves, respectively; and the index i refers to the $k_i$-th wavenumber.

Figure 9:
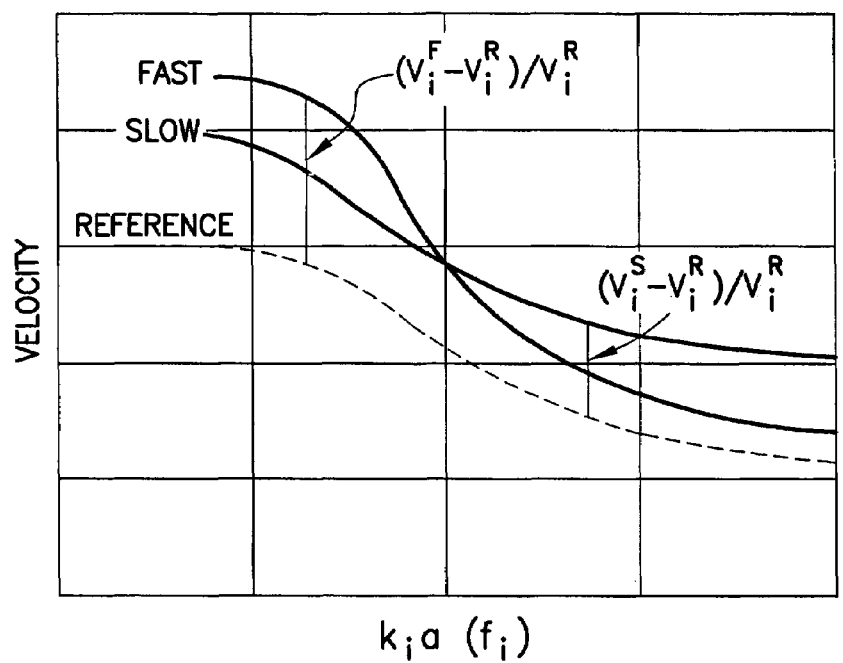
FIG. 9 is a graph of an example of the fast-, slow-, and reference flexural velocity dispersions. Normalized differences between (1) the fast-flexural and reference flexural velocities; and (2) the slow-flexural and reference flexural velocities at various wavenumbers are input to the inversion model for the estimation of $\Delta\sigma_v$. The notation is the same as in FIG. 8.

Using differences between the measured fast- or slow-flexural and reference flexural velocities at various wavenumbers (as shown in FIG. 9), and the computed sensitivity coefficients (of block 1440) $\Delta\sigma_V$ is computed (block 1445) from the following relationship:

$$\Delta\sigma_V = \frac{\sum_{i=1}^{n}\left[\frac{\Delta V_i^{F,S}}{V_i^R} - \left(\frac{\partial V_i^{F,S}}{V_i^R \partial \sigma_H}\right)\Delta\sigma_H - \left(\frac{\partial V_i^{F,S}}{V_i^R \partial \sigma_h}\right)\Delta\sigma_h\right]}{\sum_{i=1}^{n}\left(\frac{\partial V_i^{F,S}}{V_i^R \partial \sigma_V}\right)} \quad (23)$$

The overburden stress $S_V$ is calculated (block 1450) by integrating the formation mass density from the surface (denoted by 0) to the chosen depth (denoted by B), employing the following equation $$S_V = \int_O^B \rho_b g dh, \quad (24)$$

where $\rho_b$ is the formation bulk density and g is the acceleration due to gravity. Then, as represented by block 1455, the effective vertical stress change $\sigma_v$ is given by $$\sigma_v = S_v - \alpha P_p, \quad (25)$$

where $\alpha$ is the Biot parameter for a porous formation, and $P_p$ is the pore pressure change at the chosen depth B. The mean effective stress $\sigma_{vo}$ assumed in the reference state can then be solved (block 1460) using $$\sigma_{vo} = \sigma_v - \Delta\sigma_V \quad (26)$$

Then, estimates of $\sigma_H$ and $\sigma_h$ are obtained (block 1465) using $$\sigma_H = \sigma_{vo} + \Delta\sigma_H, \quad (27)$$

$$\sigma_h = \sigma_{vo} + \Delta\sigma_h, \quad (28)$$

The pore pressures $P_p$ at the selected depth are then added (block 1470) to obtain $$S_V = \sigma_V + \alpha P_p, \quad (29)$$

$$S_H = \sigma_H + \alpha P_p, \quad (30)$$

$$S_h = \sigma_h + \alpha P_p, \quad (31)$$

The entire procedure can be repeated at other depths (block 1480), and logs can be produced.

Figure 10:
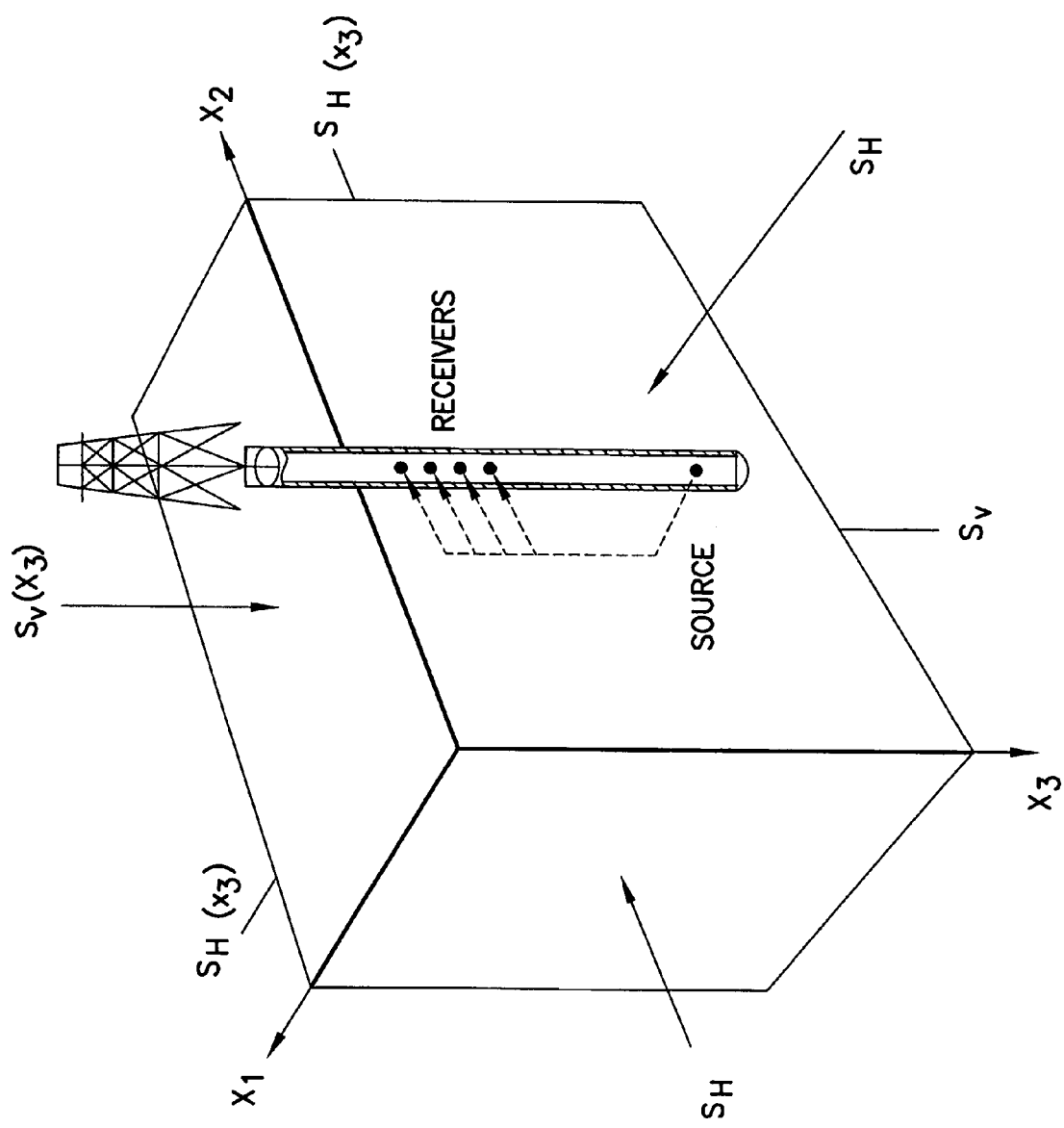
FIG. 10 is a schematic diagram of a borehole in the presence of formation principal stresses. The horizontal stresses are assumed to the same in this case.

Shales typically constitute more than 70% of the formation that a wellbore trajectory passes through before reaching the target reservoir. When dipole dispersion crossovers are not observed in the overburden shales, previously described velocity-gradient and multi-frequency inversion of cross-dipole dispersions cannot be used for estimating horizontal stresses. Vertical wells in horizontally layered shale, generally, exhibit VTI (transverse isotropy with vertical symmetry axis) anisotropy. Under these circumstances, shear isotropy is observed and cross-dipole dispersions nearly coincide with each other. This implies that the horizontal stresses are nearly isotropic, at least within the radial depth of investigation of the cross-dipole sonic tool and any uncertainty in slowness estimates. FIG. 10 shows a schematic of such a borehole in the presence of an overburden $S_V$, and equal horizontal stresses $S_H$. However, such shale intervals show compressional velocity and dipole gradients with depth.

Figure 11:
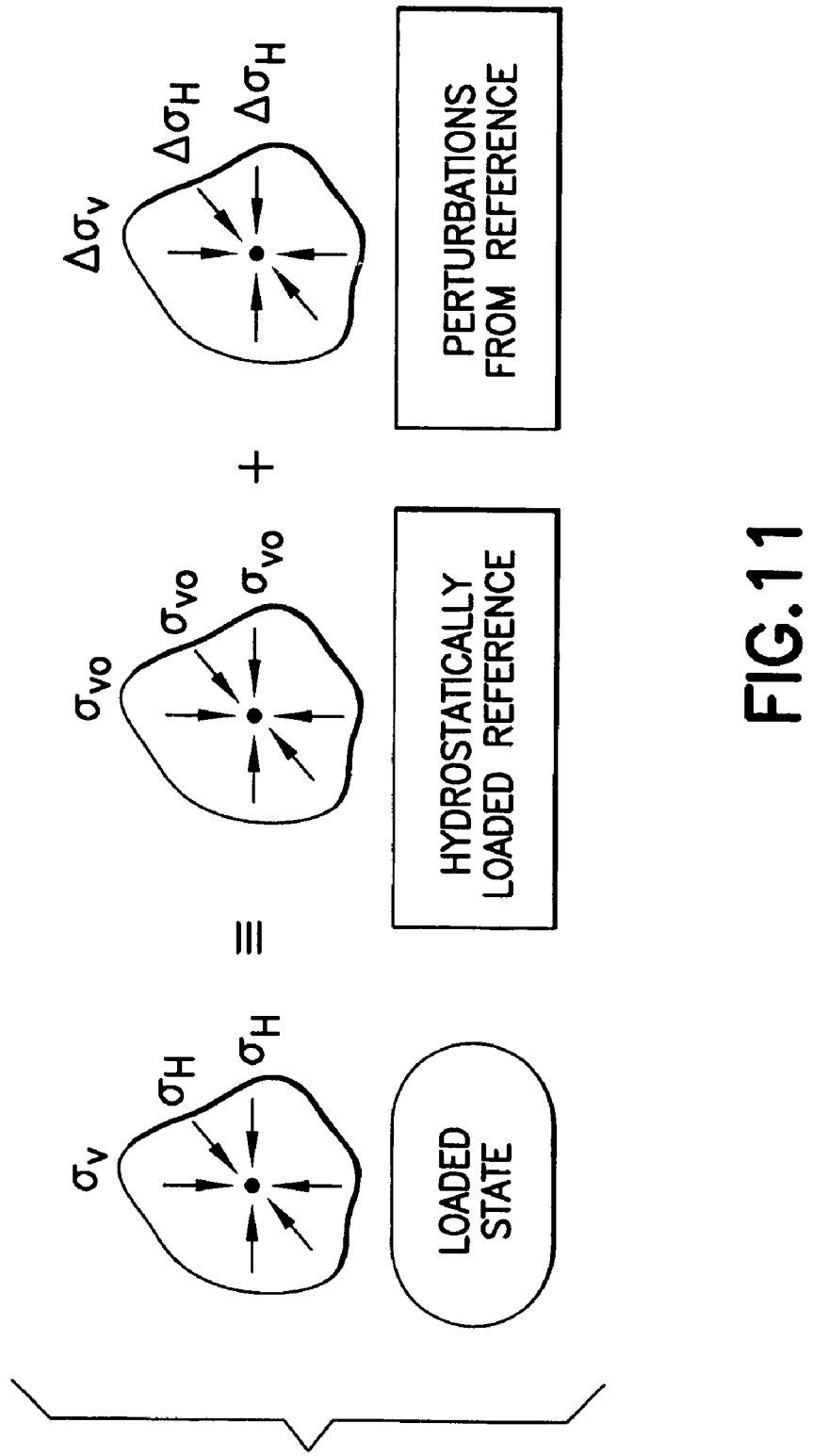
FIG. 11 illustrates a model of decomposition of formation effective streses in the far-field away from the borehole into a hydrostatically loaded reference and perturbations of tri-axial stresses. In this case, stresses in the horizontal plane are the same.

Consider a vertical fluid-filled borehole with its axis parallel to the $X_1$-direction, and isotropic horizontal stresses in the $X_2$-$X_3$-plane. Biaxial formation stresses with a vertical overburden stress as one of the principal stresses can be decomposed into a hydrostatically loaded isotropic reference and perturbations in the three principal stresses $\Delta\sigma_V$, $\Delta\sigma_H$, and $\Delta\sigma_H$ as shown in FIG. 11. Note that the mean stress $\sigma_{vo}$ in the isotropic reference state is not known at this point. However, this assumed state is defined from the measured compressional and monopole shear velocities at the chosen depth so that small perturbations in the three principal stresses $\Delta\sigma_V$, $\Delta\sigma_H$, and $\Delta\sigma_H$, would lead to the actual in-situ stresses at this depth. All of the stresses in FIG. 10 are far-field stresses beyond any stress-concentration annulus caused by the presence of a borehole.

A further embodiment of the invention includes determination of the horizontal stress $S_H$ magnitude in such overburden shales. This technique inverts differences in dipole dispersions at the top and bottom of a depth interval with a reasonably uniform lithology and mineralogy.

Figure 15A:
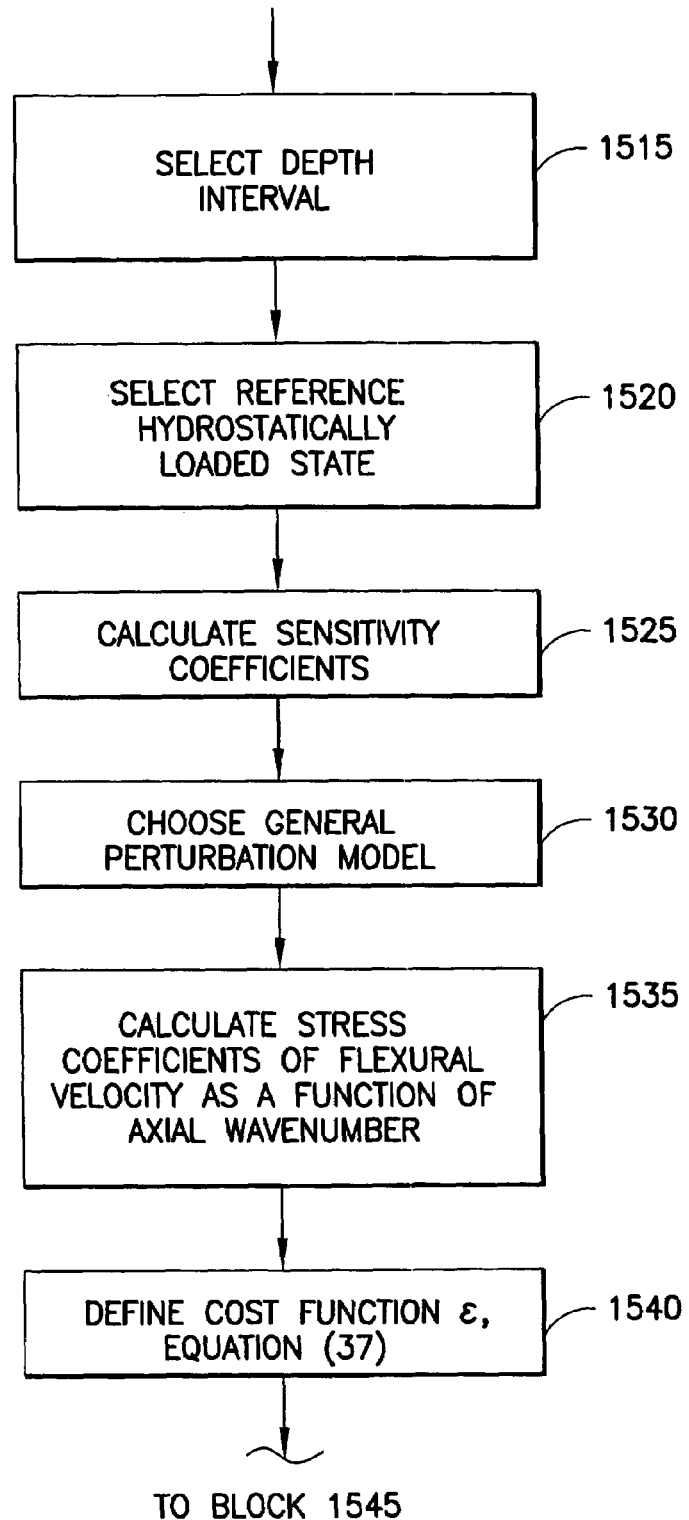
FIGS. 15A and 15B, and 15C, when placed one beneath another; show a flow diagram of a routine for programming a processor to implement another embodiment of the invention.
Figure 15B:
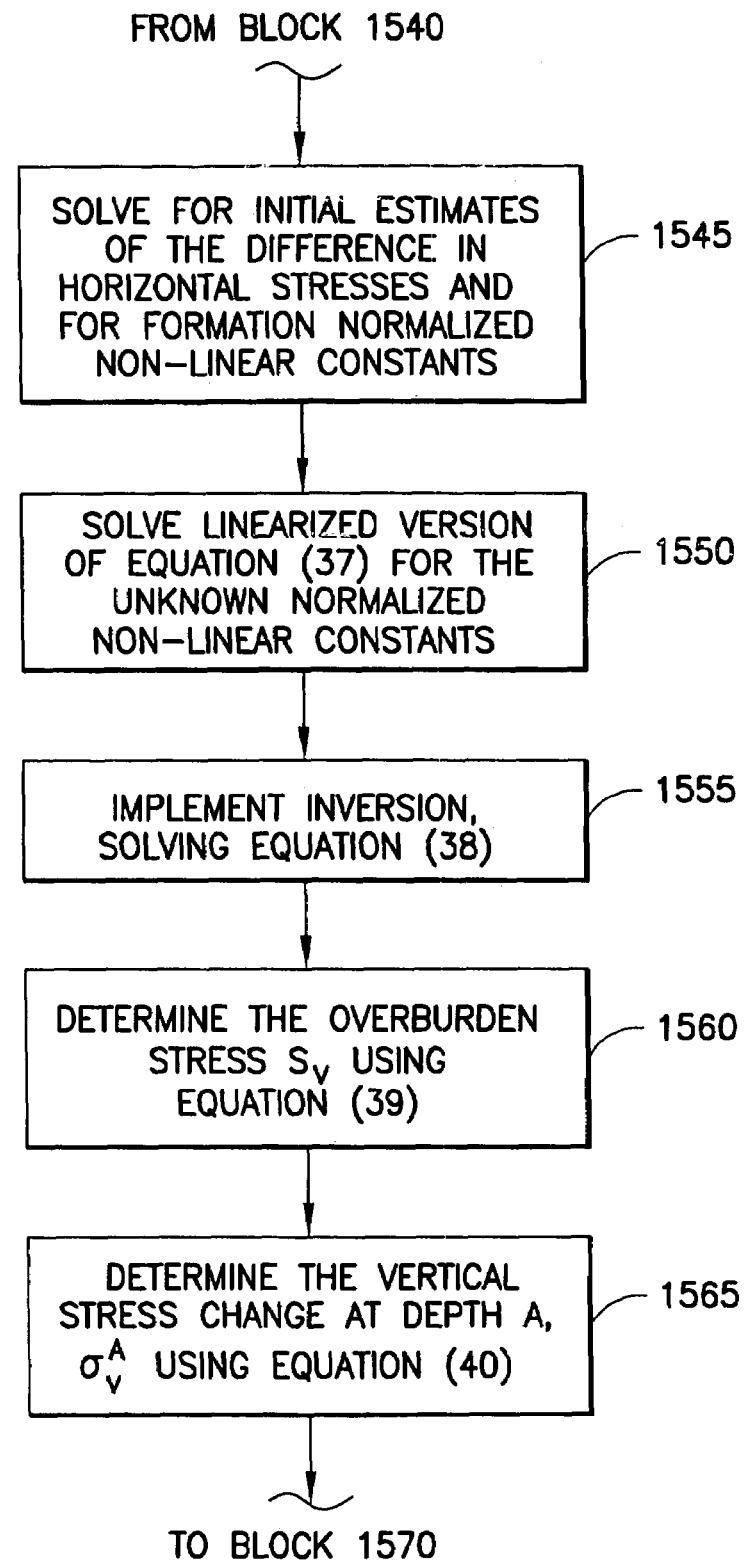
Figure 15C:
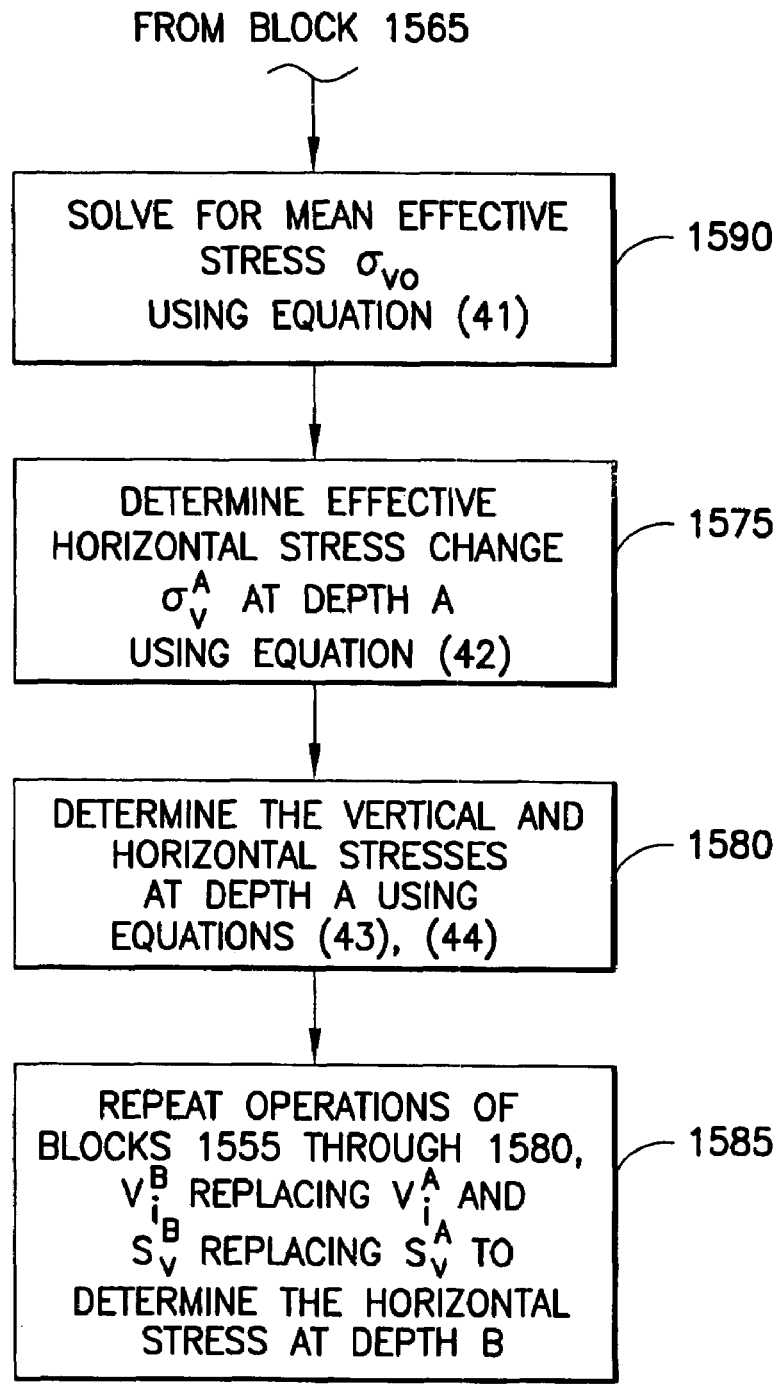

FIG. 15 is a flow diagram of a routine for practicing the further embodiment of the invention. The measurements and other derived inputs can be of the same type as previously described. A shale interval with a reasonably uniform lithology/mineralogy is identified, as represented by the block 1515.

The block 1520 represents selection of a reference hydrostatically loaded state of rock relatively close to the in-situ state of the formation at the top of the chosen depth interval (A). The reference state is defined by the compressional $V_P$, and shear $V_S$, velocities which are about 1 to 2% less than the measured $V_P$ and $V_S$ at depth A. The formation density $\rho_b$, mud density $\rho_f$ mud compressional velocity $V_f$ and borehole diameter (2a) are measured values at the top of the depth interval A.

The block 1525 represents calculating of the sensitivity coefficients $w_{1mj}^i$, $w_{2mj}^i$, $w_{3mj}^i$, and $w_{4mj}^i$ as a function of wavenumber $k_i$, for both the fast and slow flexural waves in the previously chosen reference state of block 1520. These coefficients are calculated in terms of the flexural wave eigensolution in the reference state and the near-wellbore stress distributions caused by either the maximum horizontal stress parallel (again, the fast-flexural) or perpendicular (again, the slow-flexural) to the radial polarization of the flexural wave. In the case at hand, it is assumed that $\sigma_H = \sigma_h$. The block 1530 represents choosing of a general perturbation model relating perturbations from a chosen reference state in the three principal formation stresses ($\Delta\sigma_V$, $\Delta\sigma_H$, and $\Delta\sigma_h$) to fractional changes in the borehole flexural velocities measured at depth A, and at a given wavenumber $k_i$, by $$\left(\frac{\Delta V_m^A}{V_m^R}\right)_i = \left(\frac{\partial V_m^A}{V_m^R \partial \sigma_V}\right)_i \Delta\sigma_V + \left(\frac{\partial V_m^A}{V_m^R \partial \sigma_H}\right)_i \Delta\sigma_H + \left(\frac{\partial V_m^A}{V_m^R \partial \sigma_h}\right)_i \Delta\sigma_h, \quad (32)$$

where the stress-coefficient of velocity at a given wavenumber $k_i$ is given by $$\left(\frac{\partial V_m^A}{V_m^R \partial \sigma_j}\right)_i = w_{1mj}^i + w_{2mj}^i \frac{c_{111}}{\mu} + w_{3mj}^i \frac{c_{155}}{\mu} + w_{4mj}^i \frac{c_{144}}{\mu}, \quad (33)$$

and the subscript m denotes one of the borehole modes (m=1→fast-flexural; m=2→slow-flexural; and m=3→Stoneley), and the index j represents one of the three principal stresses $\Delta\sigma_V$, $\Delta\sigma_H$, and $\Delta\sigma_h$ (j=1→$\sigma_V$; j=2→$\sigma_H$; and j=3→$\sigma_h$).

Figure 12:
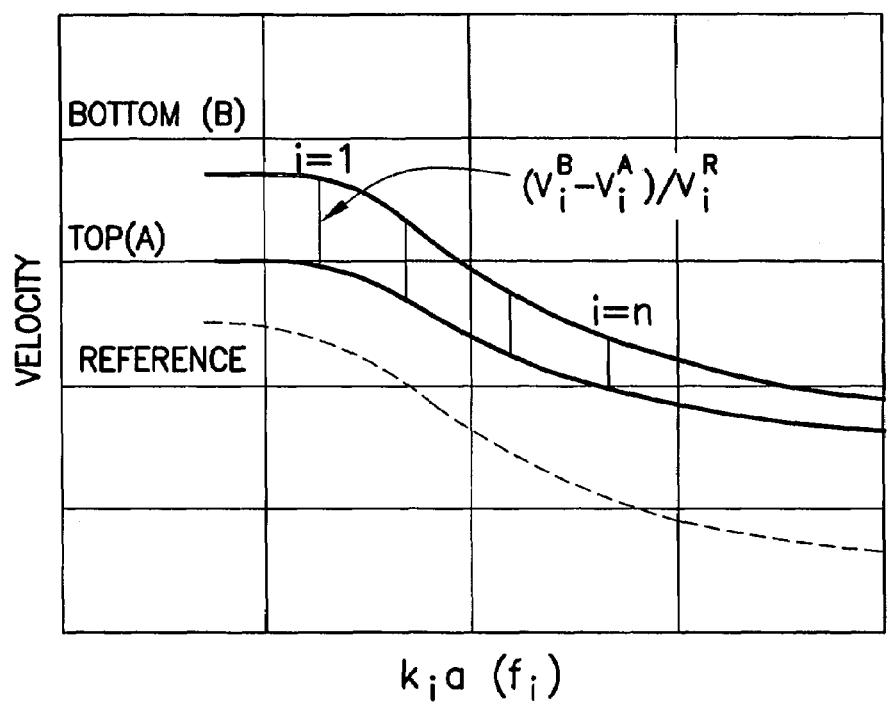
FIG. 12 is a graph of an example of the bottom-, top-, and reference flexural velocity dispersions. Normalized differences between the bottom- and top-flexural velocities at various wavenumbers are input to the inversion model for the estimation of formation nonlinear constants and $(\Delta\sigma_H^B - \Delta\sigma_H^A)$. The notation is the same as in FIG. 8.

Then, as represented by the block 1535, the stress coefficients of the flexural velocity as a function of axial wavenumber or frequency are calculated as:

$$\frac{\partial V_i^A}{V_i^R \partial \sigma_V} = w_{111}^i + w_{211}^i \frac{c_{111}}{\mu} + w_{311}^i \frac{c_{155}}{\mu} + w_{411}^i \frac{c_{144}}{\mu}, \quad (34)$$

$$\frac{\partial V_i^A}{V_i^R \partial \sigma_H} = w_{112}^i + w_{212}^i \frac{c_{111}}{\mu} + w_{312}^i \frac{c_{155}}{\mu} + w_{412}^i \frac{c_{144}}{\mu}, \quad (35)$$

$$\frac{\partial V_i^A}{V_i^R \partial \sigma_h} = w_{113}^i + w_{213}^i \frac{c_{111}}{\mu} + w_{313}^i \frac{c_{155}}{\mu} + w_{413}^i \frac{c_{144}}{\mu}, \quad (36)$$

where the superscripts A denote flexural velocities at the top of the chosen depth interval, and the subscript m has been replaced with index i that refers to the $k_i$-th wavenumber. A cost function, $\epsilon$, is defined from differences in flexural velocities between the bottom (B) and top (A) of the chosen depth interval, and sensitivity coefficients at various wavenumbers $k_i$, and unknown perturbations in stress magnitudes $\Delta\sigma_H$, and $\Delta\sigma_h$. FIG. 12 shows the velocity differences as a function of wavenumber that are needed in the expression for the cost function $\epsilon$ given as:

$$\varepsilon = \sum_{i=1}^{n} \frac{(V_i^B - V_i^A)}{V_i^R} - \quad (37)$$

$$w_{111}^i (\Delta\sigma_V^B - \Delta\sigma_V^A) - (w_{112}^i + w_{113}^i)(\Delta\sigma_H^B - \Delta\sigma_H^A) -$$

-continued $$[w_{211}^i(\Delta\sigma_V^B - \Delta\sigma_V^A) + (w_{212}^i + w_{213}^i)(\Delta\sigma_H^B - \Delta\sigma_H^A)]\frac{c_{111}}{\mu} -$$

$$[w_{311}^i(\Delta\sigma_V^B - \Delta\sigma_V^A) + (w_{312}^i + w_{313}^i)(\Delta\sigma_H^B - \Delta\sigma_H^A)]\frac{c_{155}}{\mu} -$$

$$[w_{411}^i(\Delta\sigma_V^B - \Delta\sigma_V^A) + (w_{412}^i + w_{413}^i)(\Delta\sigma_H^B - \Delta\sigma_H^A)]\frac{c_{144}}{\mu},$$

where i=1, 2, 3 . . . n, are the axial wavenumbers (or frequencies) and where the measured velocity differences $(V_i^B - V_i^A)/V_i^R$ are calculated.

Figure 13:
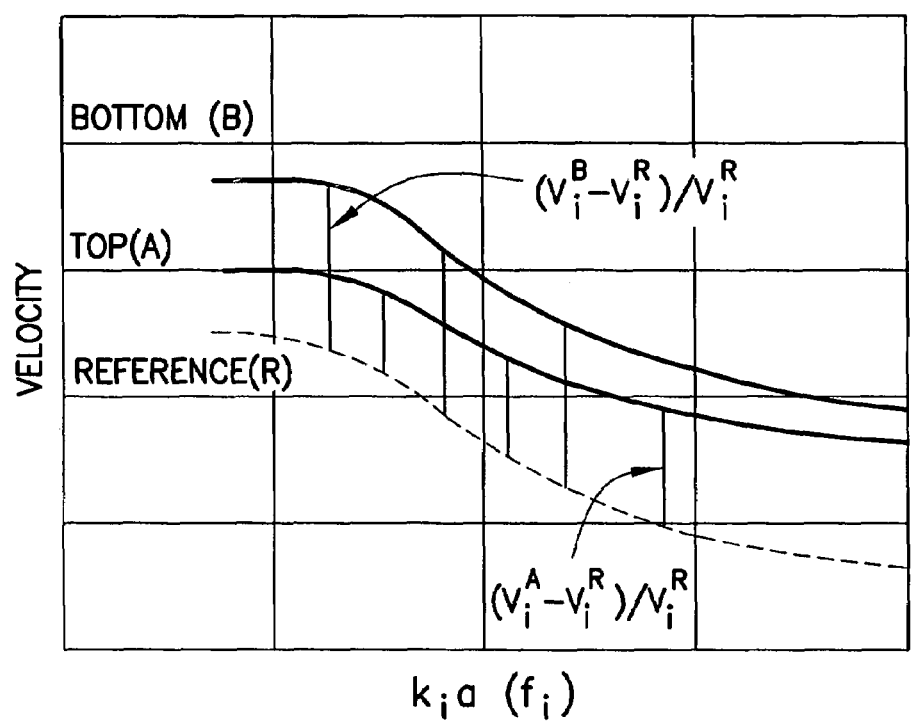
FIG. 13 is a graph of an example of the bottom-, top-, and reference flexural velocity dispersions. Normalized differences between (1) the bottom-flexural and reference flexural velocities; and (2) the top-flexural and reference flexural velocities at various wavenumbers are input to the inversion model for the estimation of $\Delta\sigma_H$. The notation is the same as in FIG. 8.

Using a nonlinear least-squares minimization of the cost function, $\epsilon$, the block 1545 represents solving for the initial estimates of formation normalized nonlinear constants ($c_{111}/\mu$, $c_{155}/\mu$, and $c_{144}/\mu$) referred to the chosen reference state, and the difference in the effective horizontal stresses ($\sigma_H^B - \sigma_H^A$) in this chosen depth interval. Then, using the calculated ratio ($\sigma_V^B - \sigma_V^A)/(\sigma_H^B - \sigma_H^A$) from block 1545 (or estimated from other sources), the block 1550 represents solving the linearized version of equation (37) for the unknowns $c_{111}/\mu$, $c_{155}/\mu$, and $c_{144}/\mu$. Next, the block 1555 represents inverting the differences between the measured flexural velocities in the reference state and those at depth A as shown in FIG. 13, for $\Delta\sigma_V^A$ and $\Delta\sigma_H^A$ by solving the following difference-equations $$\frac{(V_i^A - V_i^R)}{V_i^R} = \left[w_{111}^i + w_{211}^i \frac{c_{111}}{\mu} + w_{311}^i \frac{c_{155}}{\mu} + w_{411}^i \frac{c_{144}}{\mu}\right]\Delta\sigma_V^A + \quad (38)$$

$$\left[(w_{112}^i + w_{113}^i) + (w_{212}^i + w_{213}^i)\frac{c_{111}}{\mu} + (w_{312}^i + w_{313}^i)\frac{c_{155}}{\mu} + (w_{412}^i + w_{413}^i)\frac{c_{144}}{\mu}\right]x\Delta\sigma_H^A$$

The overburden stress $S_V$ can then be calculated (block 1560) by integrating the formation mass density from the surface (denoted by 0) to the chosen depth (denoted by A) given by the following equation $$S_V^A = \int_O^A \rho_b g dh, \quad (39)$$

where $\rho_b$ is the formation bulk density and g is the acceleration due to gravity. Then, as represented by the block 1565, the effective vertical stress change $\sigma_V$ at depth A is given by $$\sigma_V^A = S_V^A - \alpha P_P^A, \quad (40)$$

where $\alpha$ is the Biot parameter for a porous formation, and $P^A$ is the pressure change at the chosen depth A. The mean effective stress $\sigma_{vo}$ assumed in the reference state (see FIG. 11) can then be solved for (block 1570) using $$\sigma_{vo} = \sigma_V^A - \Delta\sigma_V^A \quad (41)$$

The effective horizontal stress change at depth A, $\sigma_H^A$, is then determined (block 1575) as $$\sigma_H^A = \sigma_{vo} + \Delta\sigma_H^A \quad (42)$$

The pore pressures $P_P^A$ at the selected depth A can then be added (block 1580) to obtain $$S_V^A = \sigma_V^A + \alpha P_P^A, \quad (43)$$

$$S_H^A = \sigma_H^A + \alpha P_P^A, \quad (44)$$

The operations of blocks 1555 through 1580 can then be repeated, as represented by the block 1585, to determine an estimate of the horizontal stress $S_H^B$ at depth B by replacing $V_i^A$ with $V_i^B$, and $S_V^A$ with $S_V^B$.

The invention claimed is:

1. A method for determining the maximum and minimum horizontal stresses of formations surrounding a borehole, comprising the steps of:
   suspending a logging device in the borehole;
   transmitting sonic energy from said logging device to establish flexural waves in the formations;
   receiving, at said logging device, sonic energy from said flexural waves, and producing, from the received sonic energy, measurement signals at a number of frequencies;
   determining, at said number of frequencies, the fast and slow flexural wave velocities in the formations, to obtain fast and slow flexural velocity dispersions;
   establishing a model of formation stresses in which stresses of a loaded state are represented by the sum of an omnidirectional hydrostatically loaded mean reference stress, a vertical stress perturbation, and maximum and minimum horizontal stress perturbations;
   establishing an inversion model that includes inputs from said fast and slow flexural velocity dispersions and also includes unknown horizontal perturbations of said model of formation stresses;
   deriving, from said inversion model, estimates of said maximum and minimum horizontal stress perturbations; and
   determining, from said estimates of said maximum and minimum horizontal stress perturbations and said mean reference stress, estimates of the maximum and minimum horizontal stresses of said formations.

2. The method as defined by claim 1, further comprising the step of determining stress coefficients of the fast and slow flexural velocities as a function of frequency, and using said determined stress coefficients to obtain an estimate of said vertical stress perturbation.

3. The method as defined by claim 2, further comprising determining said mean reference stress using the overburden stress, the stress due to pore pressure, and said obtained estimate of the vertical stress perturbation.

4. The method as defined by claim 3, wherein said step of determining estimates of the maximum and minimum horizontal stresses of the formations includes, respectively, adding said determined mean reference stress to said maximum horizontal stress perturbation and adding said determined mean reference stress to said minimum horizontal stress perturbation.

5. The method as defined by claim 4, wherein said step of determining estimates of the maximum and minimum horizontal stresses of the formations further includes adding pore pressures in the determination of said maximum and minimum horizontal stresses of the formations.

6. The method as defined by claim 2, further comprising deriving a reference flexural velocity dispersion, and wherein said determination of said estimate of the vertical stress perturbation also depends on said reference flexural velocity dispersion.

7. The method as defined by claim 3, further comprising deriving a reference flexural velocity dispersion, and wherein said determination of said estimate of the vertical stress perturbation also depends on said reference flexural velocity dispersion.

8. The method as defined by claim 5, further comprising deriving a reference flexural velocity dispersion, and wherein said determination of said estimate of the vertical stress perturbation also depends on said reference flexural velocity dispersion.

9. The method as defined by claim 6, wherein said step of establishing an inversion model comprises establishing said inversion model as including differences between said fast and slow flexural velocity dispersions, normalized by said reference flexural velocity dispersion.

10. The method as defined by claim 8, wherein said step of establishing an inversion model comprises establishing said inversion model as including differences between said fast and slow flexural velocity dispersions, normalized by said reference flexural velocity dispersion.

11. The method as defined by claim 9, wherein said step of deriving a reference flexural velocity dispersion includes determining said reference flexural velocity dispersion from an assumed isotropic and homogeneous formation model.

12. The method as defined by claim 10, wherein said step of deriving a reference flexural velocity dispersion includes determining said reference flexural velocity dispersion from an assumed isotropic and homogeneous formation model.

13. The method as defined by claim 11, further comprising deriving measured monopole compressional and shear velocities, and deriving said assumed isotropic and homogeneous formation model using said measured monopole compresssional and shear velocities.

14. The method as defined by claim 12, further comprising deriving measured monopole compressional and shear velocities, and deriving said assumed isotropic and homogeneous formation model using said measured monopole compresssional and shear velocities.

15. The method as defined by claim 2, wherein said step of deriving, from said inversion model, estimates of said horizontal perturbations, further comprises deriving, from said inversion model, normalized formation stiffness constants.

16. A method for determining isotropic horizontal stresses in a shale interval of formations surrounding a borehole, comprising the steps of:
   (a) suspending a logging device in the borehole;
   (b) transmitting sonic energy from said logging device to establish flexural waves in the formations;
   (c) receiving, at said logging device, sonic energy from said flexural waves, and producing, from the received sonic energy, measurement signals at a number of frequencies;
   (d) determining, at said number of frequencies, the flexural wave velocities in the formations, to obtain a flexural velocity dispersion;
   (e) performing the steps (a) through (d) at vertically spaced apart upper and lower depth levels in said shale region to obtain upper and lower flexural velocity dispersions;
   (f) establishing models of formation stresses at said upper and lower depth levels in which stresses of a loaded state are represented by the sum of an omnidirectional hydrostatically loaded mean reference stress, a vertical stress perturbation, and a horizontal stress perturbation;
   (g) establishing inversion models that include inputs from said upper and lower flexural velocity dispersions and also includes unknown vertical and horizontal perturbations of said model of formation stresses at said upper and lower depth levels;

(h) deriving, from said inversion models, estimates of said vertical and horizontal stress perturbations at said upper and lower depth levels; and (i) determining, from said estimates of said vertical and horizontal stress perturbations at said upper and lower depth levels and said mean reference stress, estimates of the horizontal stress at the upper and lower depth levels in said shale interval of said formations.

17. The method as defined by claim 16, further comprising the step of determining stress coefficients of the flexural velocities at said upper and lower depth levels as a function of frequency, and using said determined stress coefficients to obtain an estimate of said vertical stress perturbation at said upper and lower depth levels.

18. The method as defined by claim 17, further comprising determining, at said upper and lower depth levels, said mean reference stress using the overburden stress, the stress due to pore pressure, and said obtained estimate of the vertical stress perturbation.

19. The method as defined by claim 18, wherein said step of determining, at said upper and lower depth levels, an estimate of the horizontal stress of the formations includes, respectively, adding said determined mean reference stress to said horizontal stress perturbation at said upper depth level and adding said determined mean reference stress to said horizontal stress perturbation at said lower depth level.

20. The method as defined by claim 19, wherein said step of determining, at said upper and lower depth levels, an estimate of the horizontal stress of the formations further includes adding pore pressures in the determination of said horizontal stress of the formations.

21. The method as defined by claim 17, further comprising deriving a reference flexural velocity dispersion, and wherein said determination of said estimates of the vertical and horizontal stress perturbations at said upper and lower depth levels also depends on said reference flexural velocity dispersion.

22. The method as defined by claim 21, wherein said step of establishing inversion models comprises establishing said inversion models as including differences between said upper and lower flexural velocity dispersions, normalized by said reference flexural velocity dispersion.

23. The method as defined by claim 22, wherein said step of deriving a reference flexural velocity dispersion includes determining said reference flexural velocity dispersion from an assumed isotropic and homogeneous formation model.

24. The method as defined by claim 23, further comprising deriving measured monopole compressional and shear velocities, and deriving said assumed isotropic and homogeneous formation model using said measured monopole compresssional and shear velocities.

25. For use in conjunction with a technique for investigating formations surrounding an earth borehole that includes the steps of: suspending a logging device in the borehole; transmitting sonic energy from said logging device to establish flexural waves in the formations; receiving, at said logging device, sonic energy from said flexural waves, and producing, from the received sonic energy, measurement signals at a number of frequencies; and determining, at said number of frequencies, the fast and slow flexural wave velocities in the formations, to obtain fast and slow flexural velocity dispersions; a method for determining the maximum and minimum horizontal stresses of the formations, comprising the steps of:

establishing a model of formation stresses in which stresses of a loaded state are represented by the sum of an omnidirectional hydrostatically loaded mean reference stress, a vertical stress perturbation, and maximum and minimum horizontal stress perturbations;

establishing an inversion model that includes inputs from said fast and slow flexural velocity dispersions and also includes unknown horizontal perturbations of said model of formation stresses;

deriving, from said inversion model, estimates of said maximum and minimum horizontal stress perturbations; and determining, from said estimates of said maximum and minimum horizontal stress perturbations and said mean reference stress, estimates of the maximum and minimum horizontal stresses of said formations.

26. The method as defined by claim 25, further comprising the step of determining stress coefficients of the fast and slow flexural velocities as a function of frequency, and using said determined stress coefficients to obtain an estimate of said vertical stress perturbation.

27. The method as defined by claim 26, further comprising determining said mean reference stress using the overburden stress, the stress due to pore pressure, and said obtained estimate of the vertical stress perturbation.

28. The method as defined by claim 27, wherein said step of determining estimates of the maximum and minimum horizontal stresses of the formations includes, respectively, adding said determined mean reference stress to said maximum horizontal stress perturbation and adding said determined mean reference stress to said minimum horizontal stress perturbation.

29. The method as defined by claim 28, wherein said step of determining estimates of the maximum and minimum horizontal stresses of the formations further includes adding pore pressures in the determination of said maximum and minimum horizontal stresses of the formations.

30. The method as defined by claim 26, further comprising deriving a reference flexural velocity dispersion, and wherein said determination of said estimate of the vertical stress perturbation also depends on said reference flexural velocity dispersion.

31. The method as defined by claim 30, wherein said step of establishing an inversion model comprises establishing said inversion model as including differences between said fast and slow flexural velocity dispersions, normalized by said reference flexural velocity dispersion.

32. The method as defined by claim 31, wherein said step of deriving a reference flexural velocity dispersion includes determining said reference flexural velocity dispersion from an assumed isotropic and homogeneous formation model.

33. The method as defined by claim 32, further comprising deriving measured monopole compressional and shear velocities, and deriving said assumed isotropic and homogeneous formation model using said measured monopole compresssional and shear velocities.

34. The method as defined by claim 26, wherein said step of deriving, from said inversion model, estimates of said horizontal perturbations, further comprises deriving, from said inversion model, normalized formation stiffness constants.

35. For use in conjunction with a technique for investigating formations surrounding an earth borehole that includes the steps of:
(a) suspending a logging device in the borehole; (b) transmitting sonic energy from said logging device to establish flexural waves in the formations; (c) receiving, at said logging device, sonic energy from said flexural waves, and producing, from the received sonic energy, measurement signals at a number of frequencies; (d) determining, at said number of frequencies, the flexural wave velocities in the formations, to obtain a flexural velocity dispersion; a method for determining isotropic horizontal stresses in a shale interval of the formations, comprising the step of:

(e) performing the steps (a) through (d) at vertically spaced apart upper and lower depth levels in said shale region to obtain upper and lower flexural velocity dispersions;

(f) establishing models of formation stresses at said upper and lower depth levels in which stresses of a loaded state are represented by the sum of an omni-directional hydrostatically loaded mean reference stress, a vertical stress perturbation, and a horizontal stress perturbation;

(g) establishing inversion models that include inputs from said upper and lower flexural velocity dispersions and also includes unknown vertical and horizontal perturbations of said model of formation stresses at said upper and lower depth levels;

(h) deriving, from said inversion models, estimates of said vertical and horizontal stress perturbations at said upper and lower depth levels; and (i) determining, from said estimates of said vertical and horizontal stress perturbations at said upper and lower depth levels and said mean reference stress, estimates of the horizontal stress at the upper and lower depth levels in said shale interval of said formations.

36. The method as defined by claim 35, further comprising the step of determining stress coefficients of the flexural velocities at said upper and lower depth levels as a function of frequency, and using said determined stress coefficients to obtain an estimate of said vertical stress perturbation at said upper and lower depth levels.

37. The method as defined by claim 36, further comprising determining, at said upper and lower depth levels, said mean reference stress using the overburden stress, the stress due to pore pressure, and said obtained estimate of the vertical stress perturbation.

38. The method as defined by claim 37, wherein said step of determining, at said upper and lower depth levels, an estimate of the horizontal stress of the formations includes, respectively, adding said determined mean reference stress to said horizontal stress perturbation at said upper depth level and adding said determined mean reference stress to said horizontal stress perturbation at said lower depth level.

39. The method as defined by claim 38, wherein said step of determining, at said upper and lower depth levels, an estimate of the horizontal stress of the formations further includes adding pore pressures in the determination of said horizontal stress of the formations.

40. The method as defined by claim 36, further comprising deriving a reference flexural velocity dispersion, and wherein said determination of said estimates of the vertical and horizontal stress perturbations at said upper and lower depth levels also depends on said reference flexural velocity dispersion.

41. The method as defined by claim 40, wherein said step of establishing inversion models comprises establishing said inversion models as including differences between said upper and lower flexural velocity dispersions, normalized by said reference flexural velocity dispersion.

42. The method as defined by claim 41, wherein said step of deriving a reference flexural velocity dispersion includes determining said reference flexural velocity dispersion from an assumed isotropic and homogeneous formation model.

43. The method as defined by claim 42, further comprising deriving measured monopole compressional and shear velocities, and deriving said assumed isotropic and homogeneous formation model using said measured monopole compresssional and shear velocities.

* * * * *